(12) United States Patent
    Ashcroft

(10) Patent No.: US 9,765,909 B2
(45) Date of Patent: Sep. 19, 2017

(54) EXPANDABLE AND CONTRACTIBLE HOSE

(71) Applicant: Thomas William David Ashcroft, Granby (CA)

(72) Inventor: Thomas William David Ashcroft, Granby (CA)

( * ) Notice: Subject to any disclaimer, the term of this patent is extended or adjusted under 35 U.S.C. 154(b) by 0 days.

(21) Appl. No.: 15/140,435

(22) Filed: Apr. 27, 2016

(65) Prior Publication Data
    US 2016/0319965 A1    Nov. 3, 2016

Related U.S. Application Data

(60) Provisional application No. 62/153,565, filed on Apr. 28, 2015.

(51) Int. Cl.
    *F16L 11/00*    (2006.01)
    *F16L 11/12*    (2006.01)
    *B32B 1/00*     (2006.01)
    *F16L 11/118*   (2006.01)
    *F16L 33/01*    (2006.01)
    *B29C 49/00*    (2006.01)

(52) U.S. Cl.
    CPC .............. *F16L 11/12* (2013.01); *B32B 1/00* (2013.01); *F16L 11/118* (2013.01); *B29C 49/00* (2013.01); *B29K 2995/0094* (2013.01); *F16L 33/01* (2013.01)

(58) Field of Classification Search
    CPC .................................................... F16L 11/12
    USPC ................... 138/118, 119, 121, 173
    See application file for complete search history.

(56) References Cited

U.S. PATENT DOCUMENTS

| | | | |
|---|---|---|---|
| 2,814,529 A | | 11/1955 | Arnt |
| 3,035,779 A | | 5/1962 | Convis |
| 3,547,160 A | * | 12/1970 | Mc Larty ............... F16L 11/112 138/121 |
| 4,629,641 A | * | 12/1986 | Paullin ..................... F16J 3/042 138/121 |
| 4,669,508 A | * | 6/1987 | Neaves ................ B29D 23/006 138/121 |
| 4,846,510 A | * | 7/1989 | Mikol ..................... F16L 27/11 138/121 |
| 4,921,147 A | * | 5/1990 | Poirier ................... B65D 25/44 138/121 |
| 5,311,753 A | * | 5/1994 | Kanao ..................... D06F 39/08 138/103 |
| 6,041,825 A | * | 3/2000 | Smith ..................... F16L 11/15 138/109 |
| 6,523,539 B2 | | 2/2003 | McDonald et al. |

(Continued)

OTHER PUBLICATIONS

International Search Report for International Application No. PCT/IB2016/000629, Sep. 8, 2016, 11 pages.

*Primary Examiner* — Vishal Pancholi
(74) *Attorney, Agent, or Firm* — Thomas G. Ference

(57) ABSTRACT

An expandable and contractible hose, the hose includes a segmented tubular wall circumscribing an interior. The segmented tubular wall is made up of a plurality of contiguous segments. Each contiguous segment expands along the length of the hose with the application of pressure from within. A bias holds the contiguous segments in a collapsed state when no pressure is applied from within the interior. A pressurized fluid passing within the interior overcomes the bias and causes the contiguous segments to expand into an expanded state.

28 Claims, 27 Drawing Sheets

(56) References Cited

U.S. PATENT DOCUMENTS

| | | | |
|---|---|---|---|
| 6,948,527 B2 * | 9/2005 | Ragner | F16L 11/118 138/118 |
| 7,549,448 B2 | 6/2009 | Ragner | |
| 7,617,762 B1 * | 11/2009 | Ragner | F15B 15/103 92/37 |
| 7,735,523 B2 | 6/2010 | Smith et al. | |
| 8,291,941 B1 | 10/2012 | Berardi | |
| 8,291,942 B2 | 10/2012 | Berardi | |
| 2003/0098084 A1 * | 5/2003 | Ragner | A47L 9/24 138/129 |
| 2009/0032131 A1 | 2/2009 | Boettner | |
| 2010/0170589 A1 * | 7/2010 | Boettner | F16L 37/084 138/119 |
| 2012/0234425 A1 | 9/2012 | Berardi | |
| 2013/0087205 A1 | 4/2013 | Berardi | |
| 2013/0180615 A1 * | 7/2013 | Ragner | F16L 11/118 138/119 |
| 2014/0130930 A1 * | 5/2014 | Ragner | F16L 11/118 138/121 |

* cited by examiner

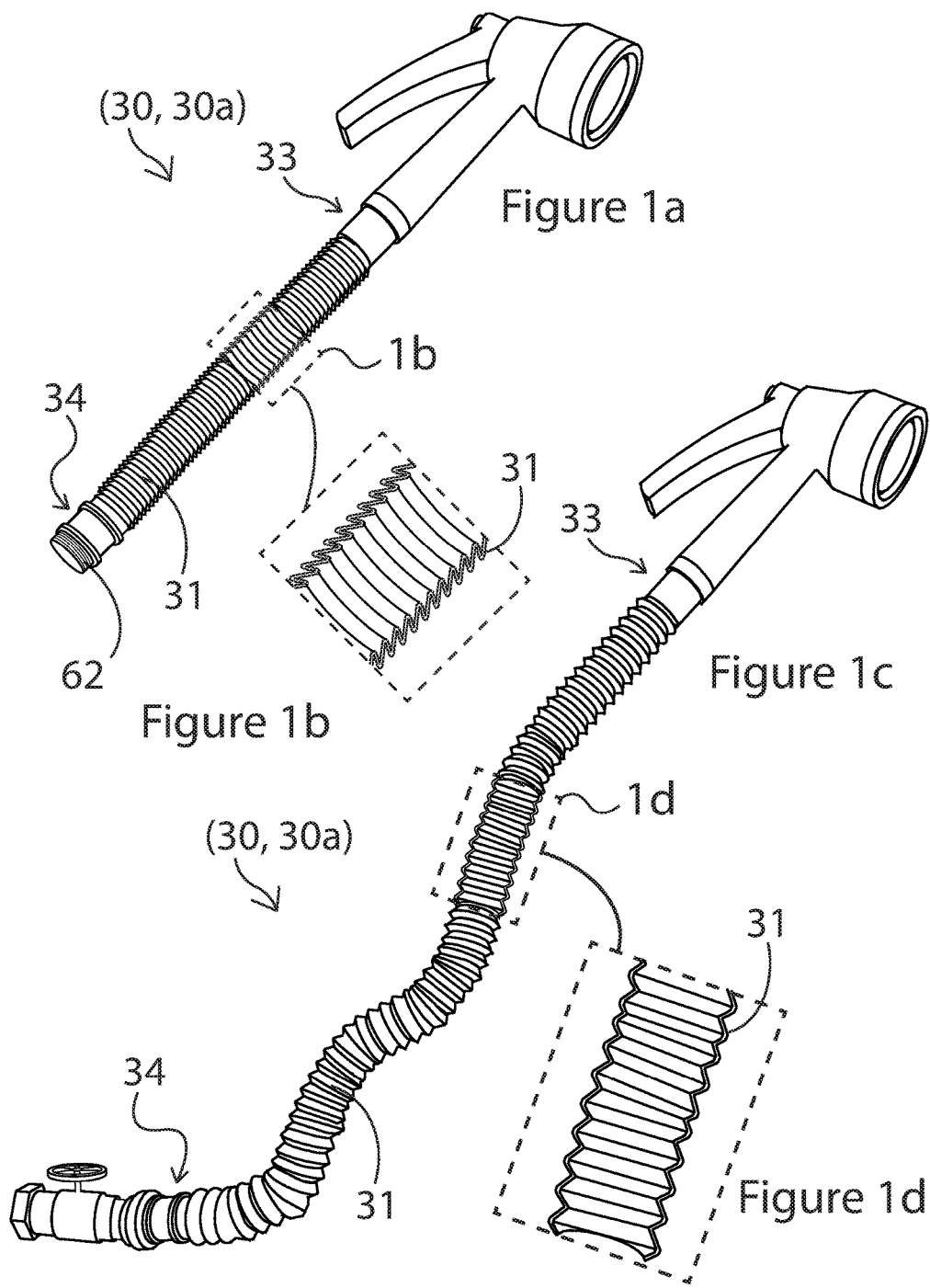

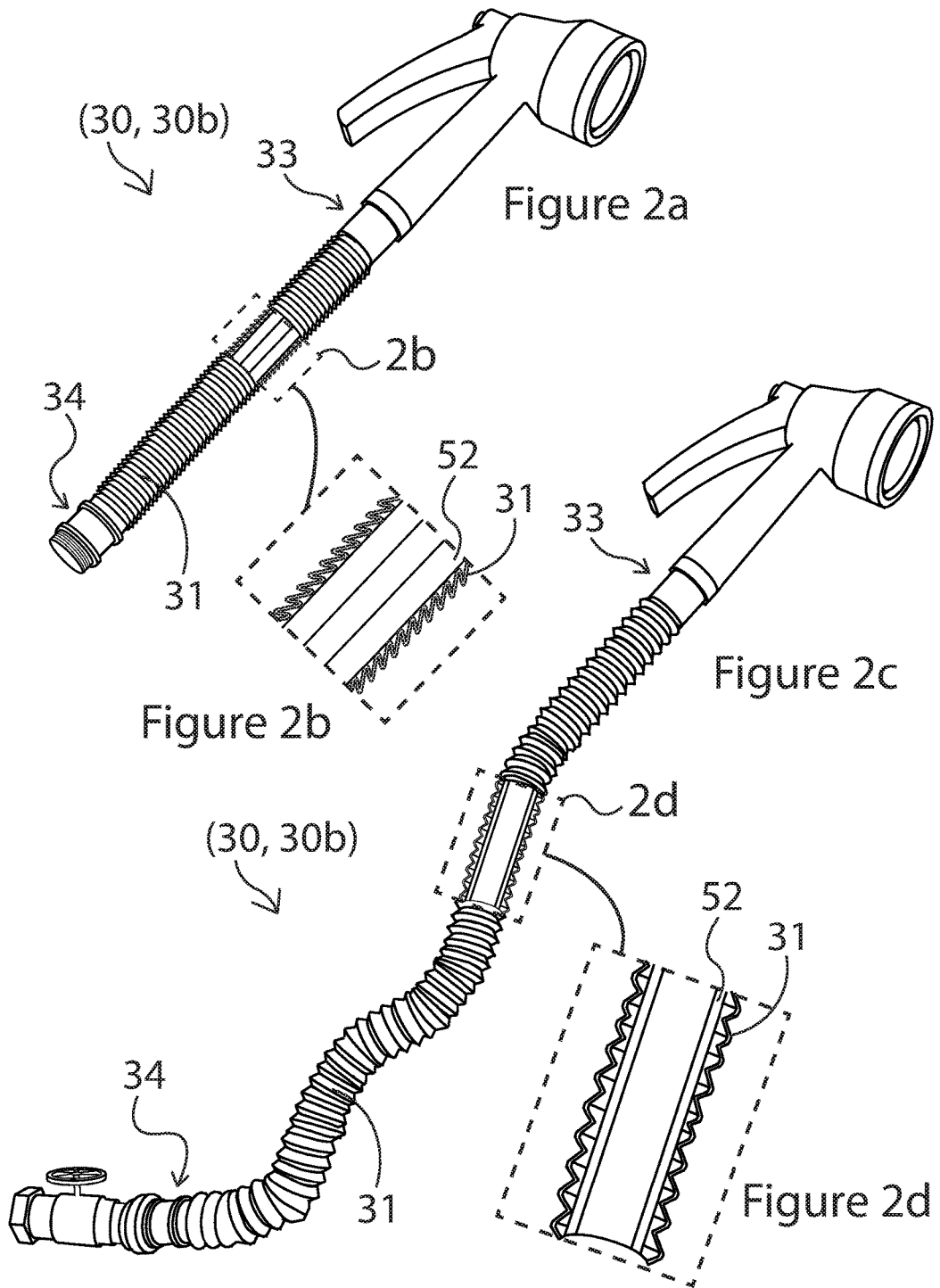

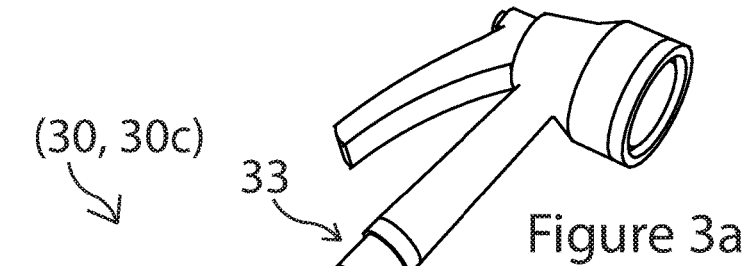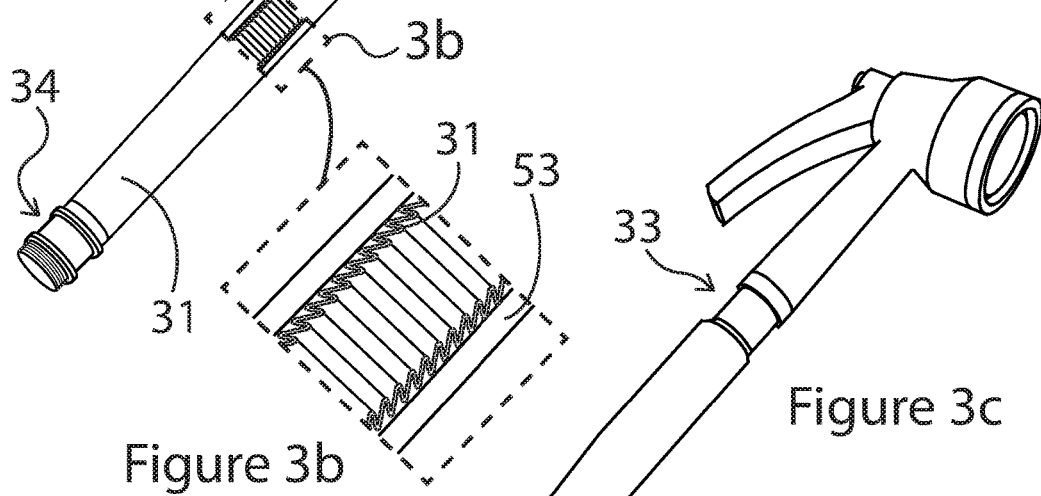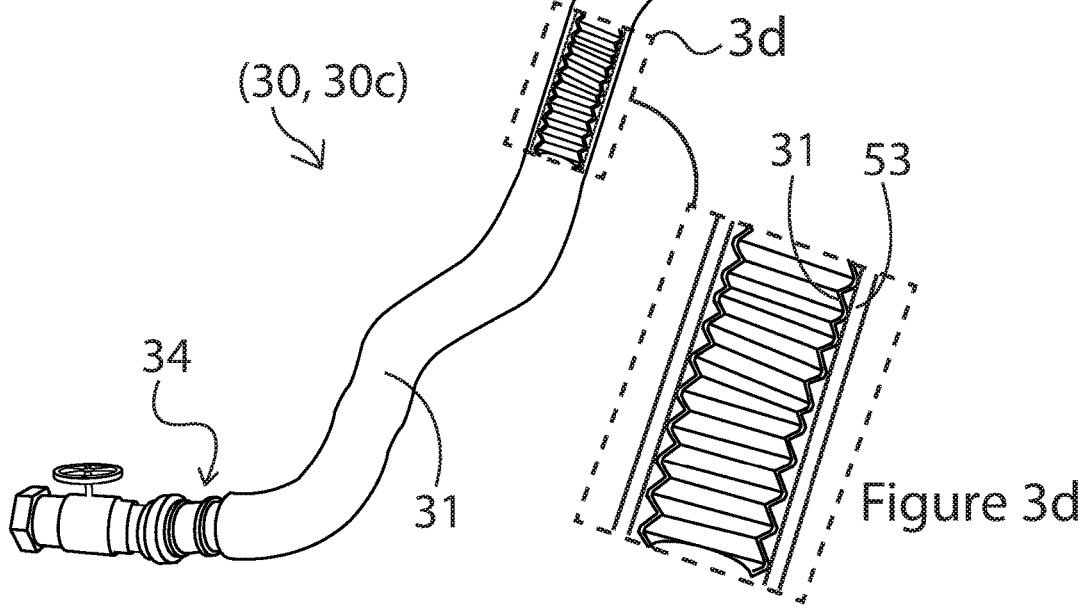

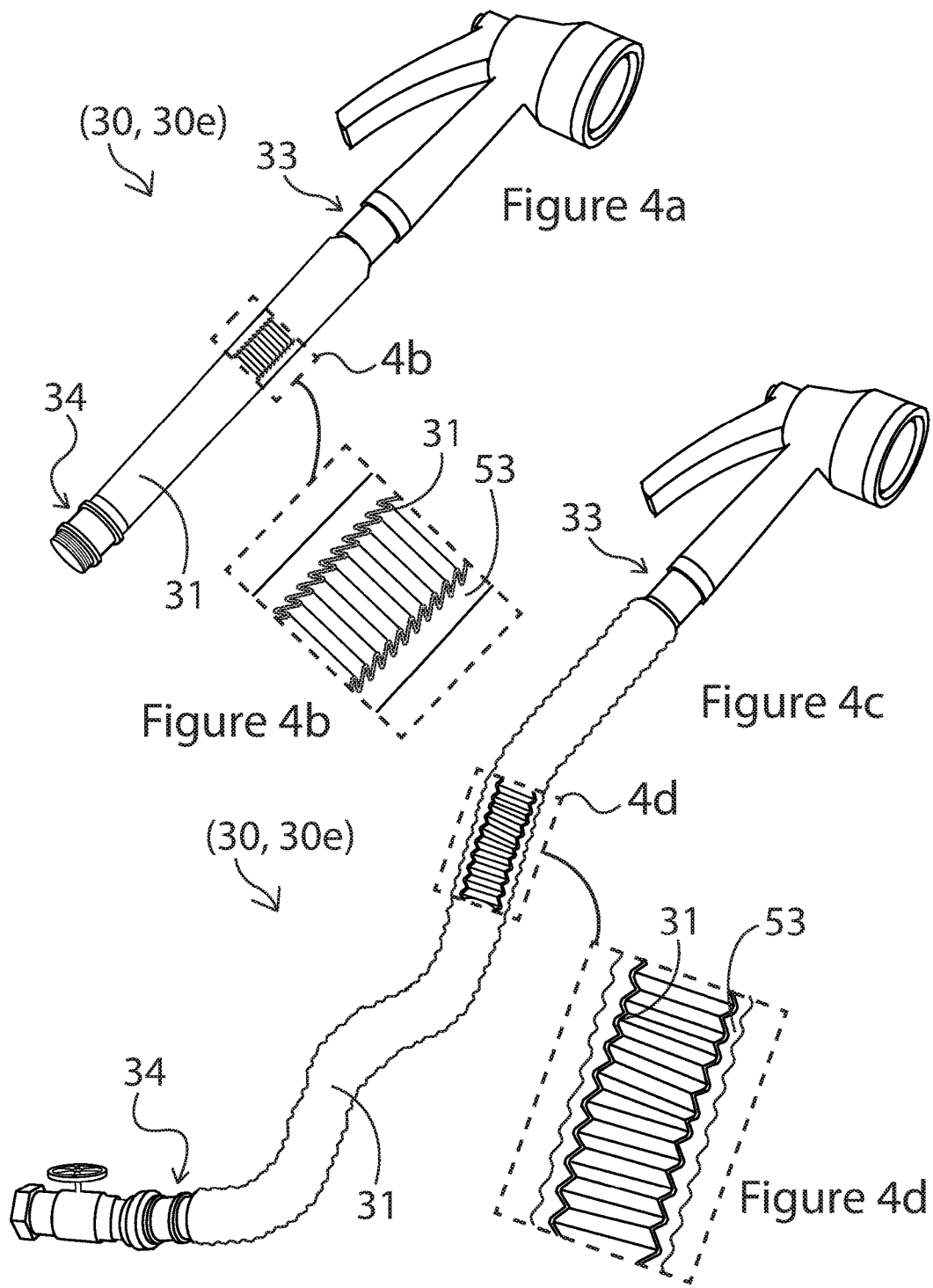

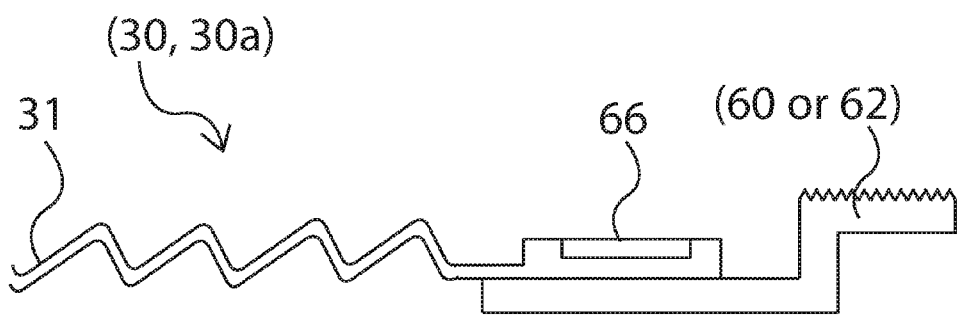
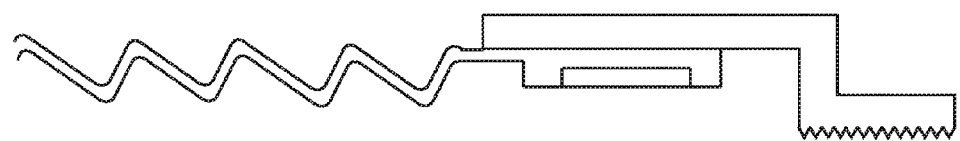
Figure 15a
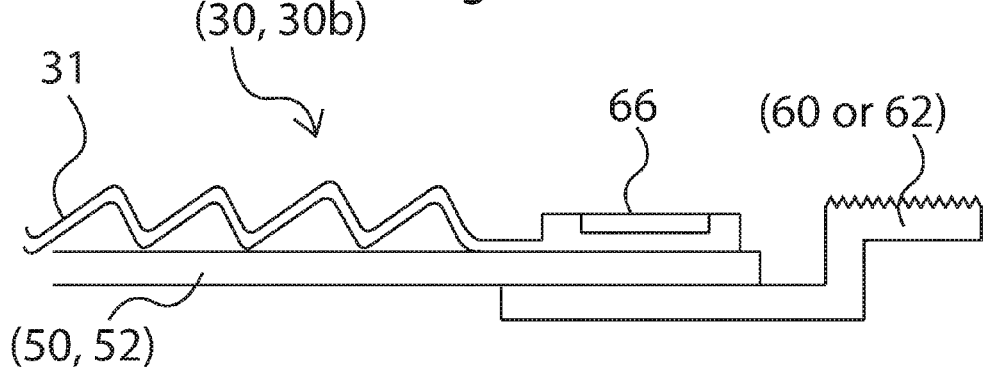
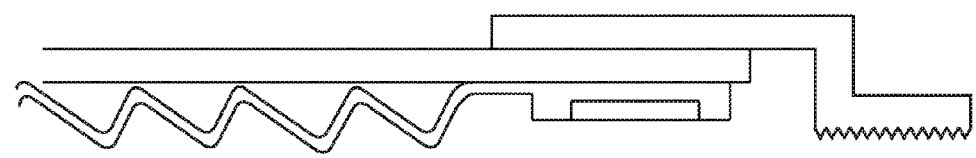
Figure 15b

Materials and Processing Parameters for Hose Memory

| Example | Material | Anneal Temperature Range (°C)* | Anneal Time (Mins) |
|---|---|---|---|
| 1 | Polyurethane | 115-135 | 30 |
| 2 | Polypropylene | 110-135 | 35 |
| 3 | Nylon | 110-135 | 35 |
| 4 | EVA (Ethyl Vinyl Acetate) | 75-100 | 30 |
| 5 | HDPE (High Density Polyethylene) | 75-110 | 30 |
| 6 | LDPE (Low Density Polyethylene) | 75-199 | 30 |
| 7 | Polyester | 135-175 | 30 |

*Temperature range may vary by 25-percent

Figure 19a

Materials and Processing Parameters for Elastic Materials

| Example | Material |
|---|---|
| 1 | Polyurethane |
| 2 | TPE (Thermoplastic Elastomer) |
| 3 | Latex |
| 4 | EDM Rubber |
| 5 | EVA (Ethyl Vinyl Acetate) |
| 6 | Vinyl |

Figure 19b

EXPANDABLE AND CONTRACTIBLE HOSE

RELATED APPLICATIONS

This application claims the benefit of priority of U.S. Provisional Patent Application No. 62/153,565, filed Apr. 28, 2015, which is herein incorporated by reference.

FIELD

This patent application generally relates to a hose. More specifically, it relates to a hose that expands and contracts in response to the amount of fluid pressure that is applied from within.

BACKGROUND

Hard rubber watering hoses have been the standard for decades. They are heavy, not easy to handle and hard to store. More recently lighter weight expanding and contracting hoses have become popular as disclosed in U.S. Pat. Nos. 8,291,941 and 8,291,942 to Berardi. The present patent application aims to provide a novel expandable and contractible hose that is light-weight, durable, abrasion resistant and can endure high fluid pressure.

SUMMARY

One aspect of the present patent application is a hose that contracts and expands under the influence of fluid pressure from within. The hose comprises a segmented tubular wall circumscribing an interior; the segmented tubular wall has a first end, a second end and length. The segmented tubular wall is a plurality of contiguous segments. Each contiguous segment has a circumscribing apex lying within a transverse plane and defining an outer radius, a first wall segment angled from the apex towards the interior at a first angle from the transverse plane, and a second wall segment angled from the apex towards the interior at a second angle from the transverse plane. The first and second wall segments of adjacent contiguous segments terminate in a circumscribing trough defining an inner radius. The first and second wall segments extend from the same side of the transverse plane in a contracted state and extend from opposites sides of the transverse plane in an expanded state. A bias is provided to keep said first wall segment and second wall segment on the same side of the transverse plane in a contracted state. The bias may be a memory force built into the segmented tubular wall, an external bias that is located outside of the segmented tubular wall, an internal bias that is located within the interior of the segmented tubular wall, or a combination of any thereof.

Another aspect of the present patent application is a hose that contracts and expands under the influence of fluid pressure from within. The hose comprises a segmented tubular wall circumscribing an interior; the segmented tubular wall has a first end, a second end and length. The segmented tubular wall has a plurality of contiguous segments that each expand along the length of the segmented tubular wall with the application of pressure from within the interior. The hose further includes a bias to hold the continuous segments in a collapsed state when no pressure is applied from within said interior. The bias may be a memory force built into the segmented tubular wall, an external bias that is located outside of the segmented tubular wall, an internal bias that is located within the interior of the segmented tubular wall, or a combination of any thereof.

BRIEF DESCRIPTION OF DRAWINGS

For the purposes of illustrating the invention, the drawings show aspects of one or more embodiments of the invention. However, it should be understood that the present invention is not limited to the precise arrangements and instrumentalities shown in the drawings, wherein:

FIG. 1a is a partial sectional, perspective view of a hose having a segmented tubular wall in the collapsed state as described in the present disclosure;

FIG. 1b is an enlarged view of the dashed section 1b outlined in FIG. 1a;

FIG. 1c is a partial sectional, perspective view of the hose in FIG. 1a in the expanded state;

FIG. 1d is an enlarged view of the dashed section 1d outlined in FIG. 1c;

FIG. 2a is a partial sectional, perspective view of the hose in FIG. 1a further including an internal elastic wall as an internal bias;

FIG. 2b is an enlarged view of the dashed section 2b outlined in FIG. 2a;

FIG. 2c is a partial sectional, perspective view of the hose in FIG. 2a in the expanded state;

FIG. 2d is an enlarged view of the dashed section 2d outlined in FIG. 2c;

FIG. 3a is a partial sectional, perspective view of the hose in FIG. 1a further including an external elastic wall of a sleeve as an external bias;

FIG. 3b is an enlarged view of the dashed section 3b outlined in FIG. 3a;

FIG. 3c is a partial sectional, perspective view of the hose in FIG. 3a in the expanded state;

FIG. 3d is an enlarged view of the dashed section 3d outlined in FIG. 3c;

FIG. 4a is a partial sectional, perspective view of the hose in FIG. 1a further including an external elastic layer bonded to the segmented tubular wall, the external elastic layer acting as an external bias;

FIG. 4b is an enlarged view of the dashed section 4b outlined in FIG. 4a;

FIG. 4c is a partial sectional, perspective view of the hose in FIG. 4a in the expanded state;

FIG. 4d is an enlarged view of the dashed section 4d outlined in FIG. 4c;

FIG. 6b is a side, sectional view of the segmented tubular wall shown in FIG. 6a;

FIG. 7b is a side, sectional view of the segmented tubular wall shown in FIG. 7a;

FIG. 9b is a side, sectional view of the segmented tubular wall in FIG. 9a;

FIG. 10b is a side, sectional view of the segmented tubular wall in FIG. 10a;

FIG. 15a is a side, sectional view of one embodiment of a coupler that may be added to an end of the hose in FIGS. 1a and 1c;

FIG. 15b is a side, sectional view of one embodiment of a coupler that may be added to the hose in FIGS. 2a and 2c;

FIG. 19a is a table listing various materials and processing parameters that may be used to form the expanding and contracting segmented tubular wall shown in FIGS. 1a-4d and 13a-13b;

FIG. 19b is a table listing various elastic materials that may be used to form the internal and external biasing elements;

FIG. 22b is a side, sectional view when pressurized fluid fills the hose shown in FIG. 22a;

FIG. 22c is a side, sectional view when unpressurized fluid fills the hose shown in FIG. 22a;

FIG. 23b is a side, sectional view when pressurized fluid fills the hose shown in FIG. 23a;

FIG. 23c is a side, sectional view when unpressurized fluid fills the hose shown in FIG. 23a;

FIG. 24b is a side, sectional view when pressurized fluid fills the hose shown in FIG. 24a;

FIG. 24c is a side, sectional view when unpressurized fluid fills the hose shown in FIG. 24a;

FIG. 25b is a side, sectional view when pressurized fluid fills the hose shown in FIG. 25a; and FIG. 25c is a side, sectional view when unpressurized fluid fills the hose shown in FIG. 25a.

DETAILED DESCRIPTION

Figure 5A:
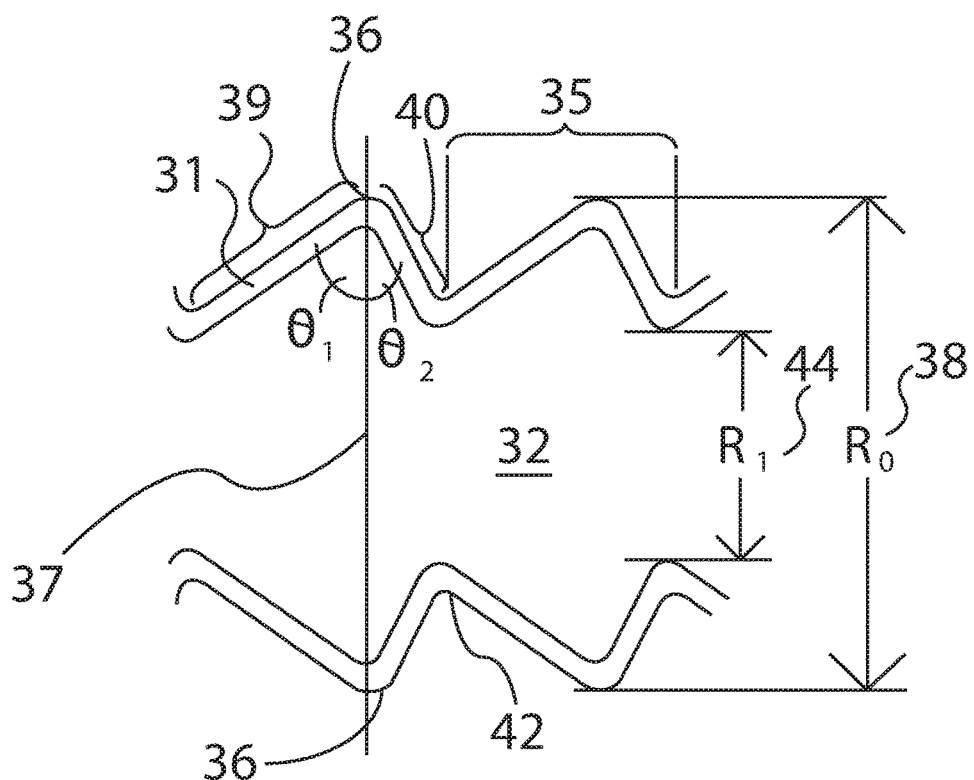
FIG. 5a is a side, sectional schematic view of two contiguous segments of the segmented tubular wall of FIGS. 1c, 2c, 3c and 4c illustrating various elements of the segmented tubular wall in the expanded state.
Figure 5B:
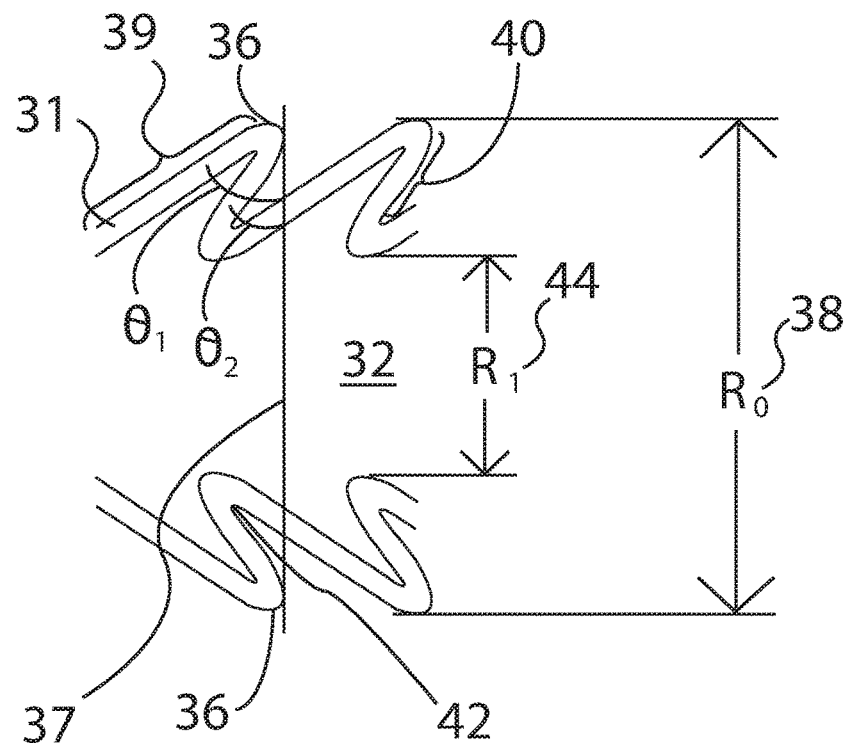
FIG. 5b is a side, sectional schematic view of two contiguous segments of the segmented tubular wall of in FIGS. 1a, 2a, 3a and 4a illustrating various elements of the segmented tubular wall in the contracted state.
Figure 6A:
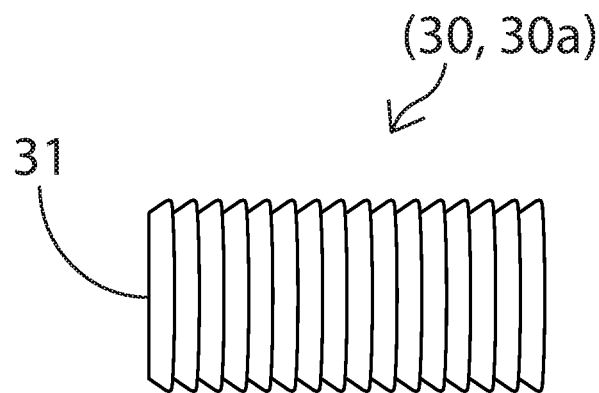
FIG. 6a is a side view of a section of the segmented tubular wall of FIGS. 1a, 2a, 3a and 4a in the contracted state.
Figure 6B:
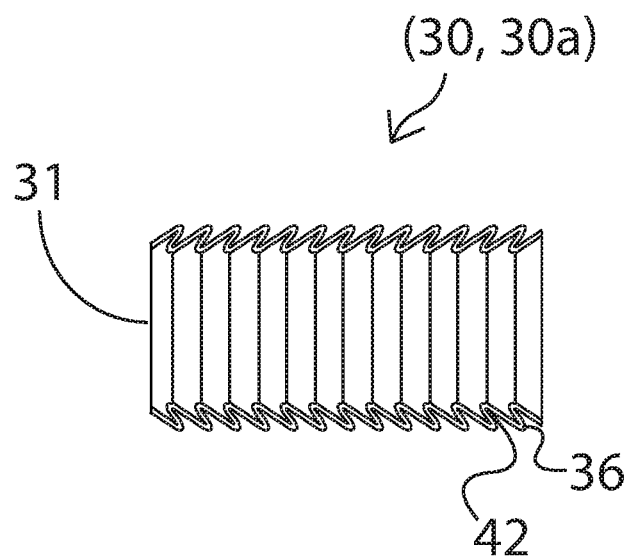
Figure 7A:
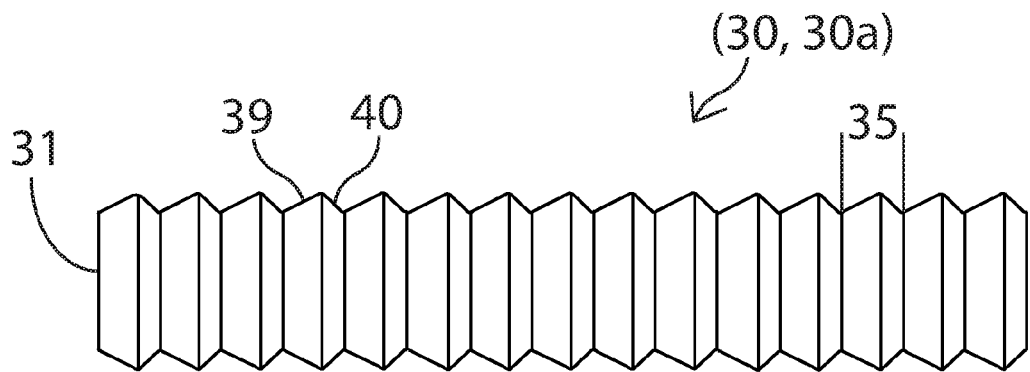
FIG. 7a is side view of a section of the segmented tubular wall of FIGS. 1c, 2c, 3c and 4c in the expanded state.
Figure 7B:
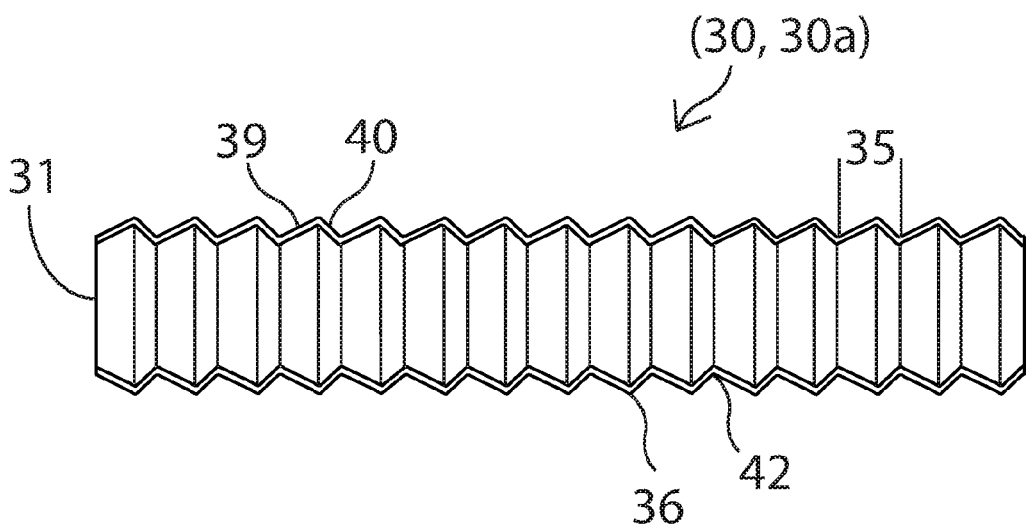

FIGS. 1a-25c illustrate various aspects of expandable and contractible hose 30 having multiple embodiments 30a, 30b, 30c, 30d, 30e and 30f. Hose 30 comprises a segmented tubular wall 31 circumscribing an interior 32. Segmented tubular wall 31 has a first end 33, a second end 34 and length. Segmented tubular wall 31 is a plurality of contiguous segments 35. Each contiguous segment 35 has a circumscribing apex 36 lying within a transverse plane 37 and defining an outer radius 38, a first wall segment 39 angled from apex 36 towards interior 32 at a first angle $\theta_1$ from transverse plane 37, and a second wall segment 40 angled from apex 36 towards interior 32 at a second angle $\theta_2$ from transverse plane 37. Transverse plane 37 is generally perpendicular to the length of the hose. First wall and second wall segments of adjacent contiguous segments terminate in a circumscribing trough 42 defining an inner radius 44. First wall segment 39 and second wall segment 40 extend from the same side of transverse plane 37 in a contracted state (FIG. 5b) and extend from opposites sides of the transverse plane in an expanded state (FIG. 5a).

First wall segments 39 and second wall segments 40 are each generally sections of a conical surface and more particularly frustum of a right cone. Each pair of wall segments (39, 40), making up a contiguous segment 35, is generally equally spaced in the contracted state or in the expanded state. Also, each contiguous segment 35 is preferably identically shaped so they can collapse and stack tightly together in the collapsed state.

Figure 8:
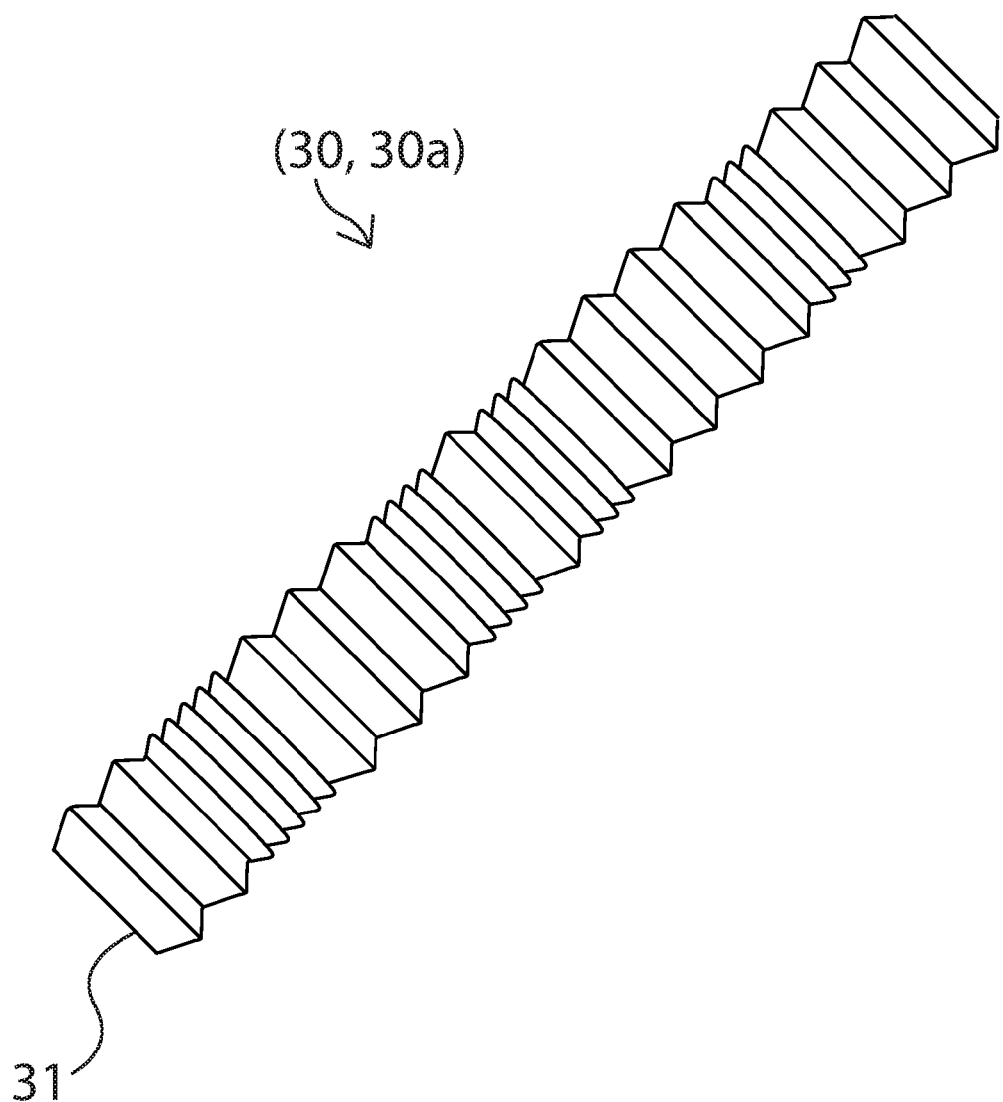
FIG. 8 is a side view of a section of the segmented tubular wall shown in FIGS. 1a-4d depicting one embodiment of how the contiguous segments of the hose may expand and contract.

The ability of hose 30 to expand and contract is a property of second angle $\theta_2$ being less than first angle $\theta_1$ in both the expanded and contracted states. Second wall segment 40 can flip back and forth across transverse plane 37 to create a shorter length hose in the contracted state and a longer length hose in the expanded state. Application of pressure from within interior 32 in conjunction with bias 50 work together to cause second angle $\theta_2$ to transition from one side to the other side of transverse plane 37. First angle $\theta_1$ and second angle $\theta_2$ combine to form an expansion angle having a magnitude of close to zero in the collapsed state and greater than 30-degrees in the expanded state. Segmented tubular wall 31 generally has an elongation ratio, the length in the expanded state to the length in the contracted state, that is generally greater than 2:1 and preferably in the range of 3:1 to 10:1. The expansion ratio is a function of the angle of each segment relative to transverse plane 37 and the length of each wall segment (39, 40). First angle $\theta_1$ and second angle $\theta_2$ may retain relatively low angles to retain a significantly grooved structure or expand all the way to 90-degrees to give a generally smooth segmented tubular wall depending on the material, wall thickness and pressure within said segmented tubular wall. Contiguous segments 35 may expand and contract independently of other contiguous segments, as depicted in FIG. 8, so that the length of hose 30 increases in discrete increments. Alternatively, contiguous segments 35 may expand and contract equally to have the length of hose 30 increase or decrease continuously.

Hose 30 comprises some type of bias 50 that is required to keep first wall segment 39 and second wall segment 40 on the same side of transverse plane 37 in the contracted state, but allow the first wall segment and second wall segment to lie on opposite sides of the transverse plane when in an expanded state. Bias 50 may be an intrinsic bias that is inherently built into segmented tubular wall 31 such as a material memory force built into the segmented tubular wall. A hose 30a based on such an intrinsic bias is shown in FIGS. 1a-1d and 22a-22c.

Bias 50 may be an internal bias from an internal biasing element 52. Internal biasing element 52 may be any internal biasing element such as a spring, an elastic strip, an elastic coating, an elastic tube or other elastic material structure having an elastic wall, etc. A hose 30b based on one such internal bias, specifically an internal elastic tube having an internal elastic wall, is shown in FIGS. 2a-2d, 11a-11b and 23a-23c.

Figure 12A:
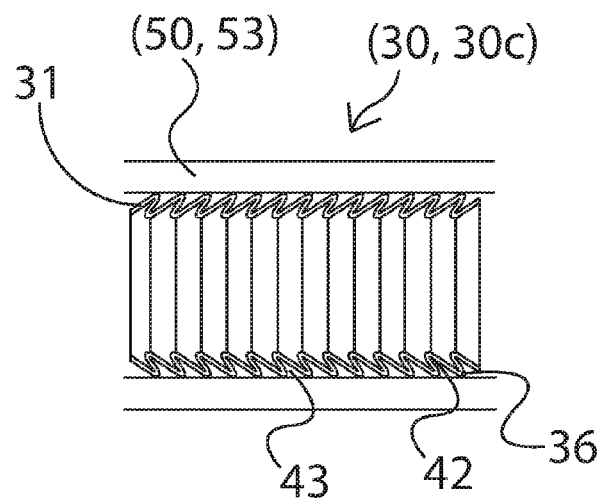
FIG. 12a is a side, sectional view of a section of hose of FIG. 3a in the contracted state showing both the segmented tubular wall and external elastic tubular wall as a sleeve.
Figure 12B:
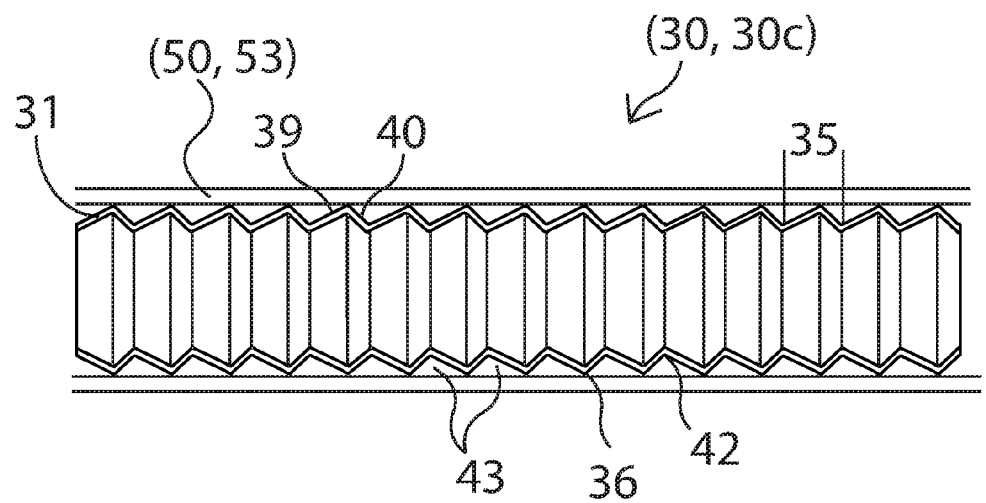
FIG. 12b is a side, sectional view of the section of hose of FIG. 12a in the expanded state.
Figure 13A:
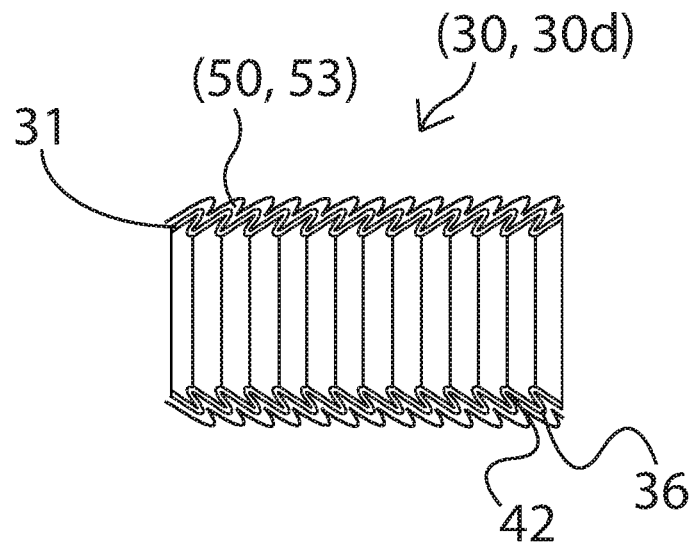
FIG. 13a is a side, sectional view of an alternative embodiment of a section of hose of FIG. 3a in the contracted state showing both the segmented tubular wall and an external elastic wall as an elastic coating.
Figure 13B:
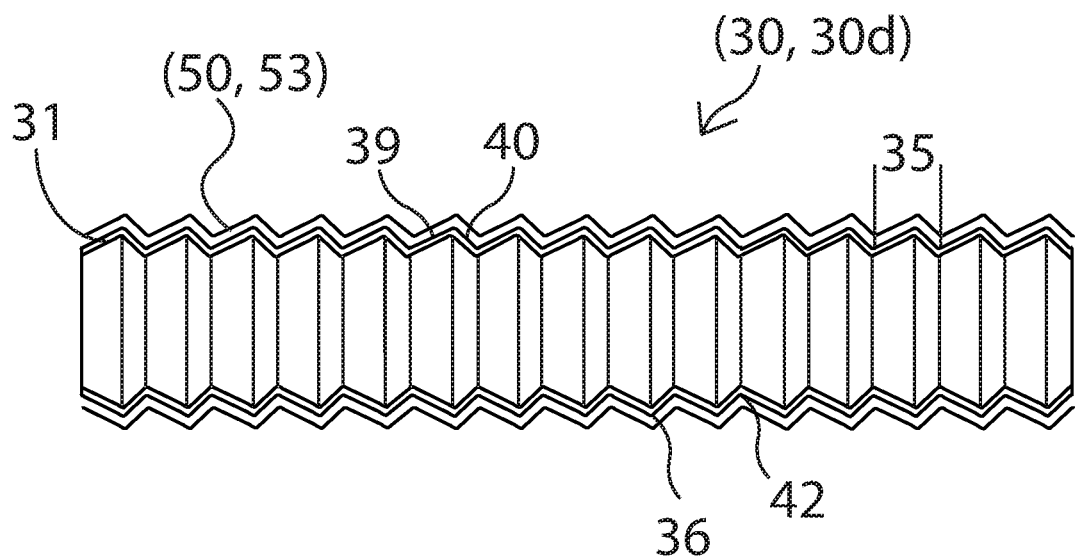
FIG. 13b is a side, sectional view of the section of hose of FIG. 13a in the expanded state.
Figure 14A:
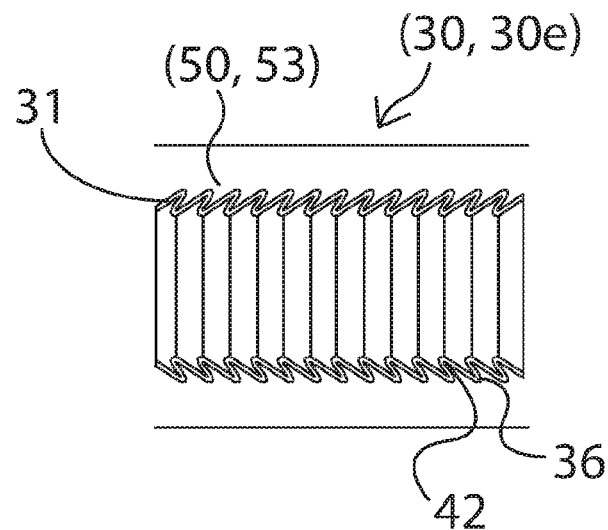
FIG. 14a is a side, sectional view of a section of hose of FIG. 4a in the contracted state showing both the segmented tubular wall and an external elastic wall as a bonded layer.
Figure 14B:
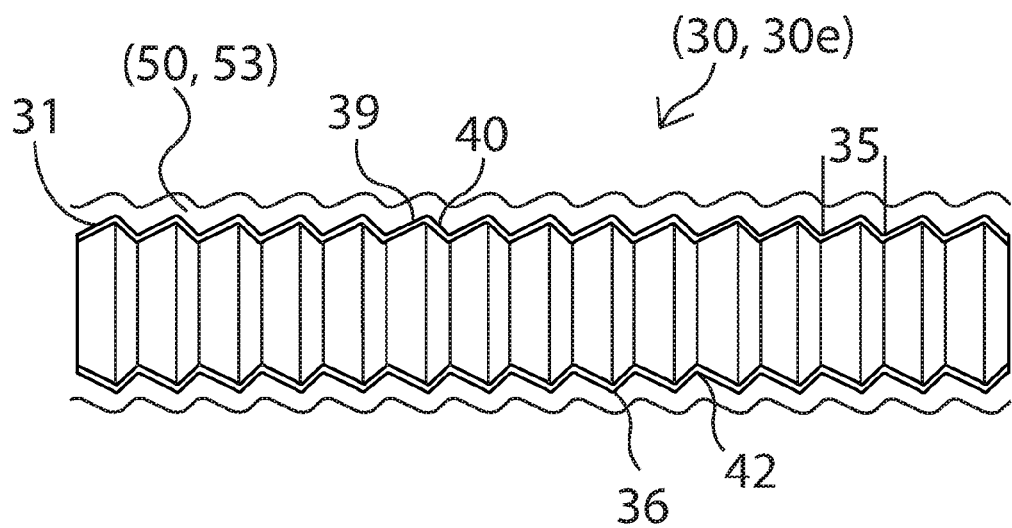
FIG. 14b is a side, sectional view of the section of hose of FIG. 14a in the expanded state.

Bias 50 may be an external bias from an external biasing element 53. External biasing element 53 may be any external biasing element such as a spring, an elastic coating, an elastic layer, co-extruded elastic layer, a dipped or sprayed elastic coating or layer, an elastic material having an elastic wall, etc. External biasing element 53 may be a sleeve that freely moves independently over segmented tubular wall 31. External biasing element 53 may be partially bonded to some or all of the contiguous segments. For example, FIGS. 12a and 12b show how an external elastic layer (50, 53) may be bonded at apex 36 of each contiguous segment 35 with air gaps 43 between the external elastic layer and segmented tubular wall 31 at said troughs 42. External biasing element 53 may also be bonded everywhere to segmented tubular wall 31. A hose 30c based on one type of external bias, an external elastic sleeve having an external elastic wall, is shown in FIGS. 3a-3d and 12a-12b and 24a-24b. A hose 30e based on another type of external bias, an external elastic layer at least partially bonded to segmented tubular wall 31, is shown in FIGS. 4a-d,13a-14b and 25a-25c. The external elastic layer may be integrally bonded to the entire segmented tubular wall or partially bonded with some air gaps. The external elastic layer may be porous to allow air to easily flow to create air gaps or the external elastic layer may be nonporous. It is noted that hose 30 (30a, 30b, 30c, 30d, 30e, 30f) all include a segmented tubular wall 31 that may or may not have an inherently built-in bias that may then work in conjunction with an additional internal or external bias to help expand and contract the hose. Therefore hose 30 may have any combination of an intrinsic bias, an internal bias and an external bias.

Figure 9A:
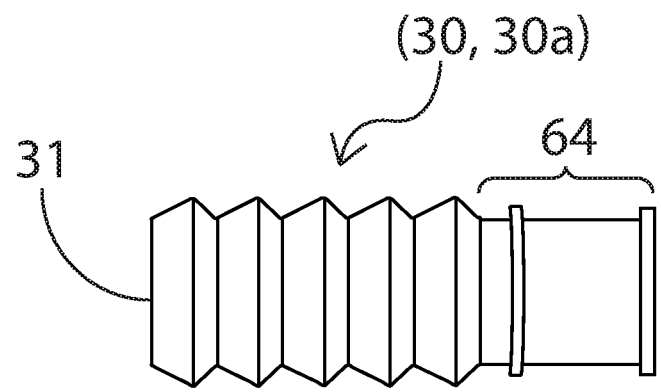
FIG. 9a is a side view of the segmented tubular wall in FIG. 1c, showing one embodiment of the end structure of the hose.
Figure 9B:
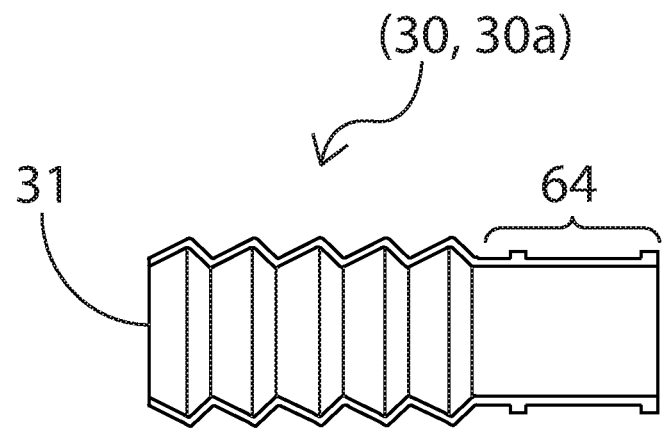
Figure 10A:
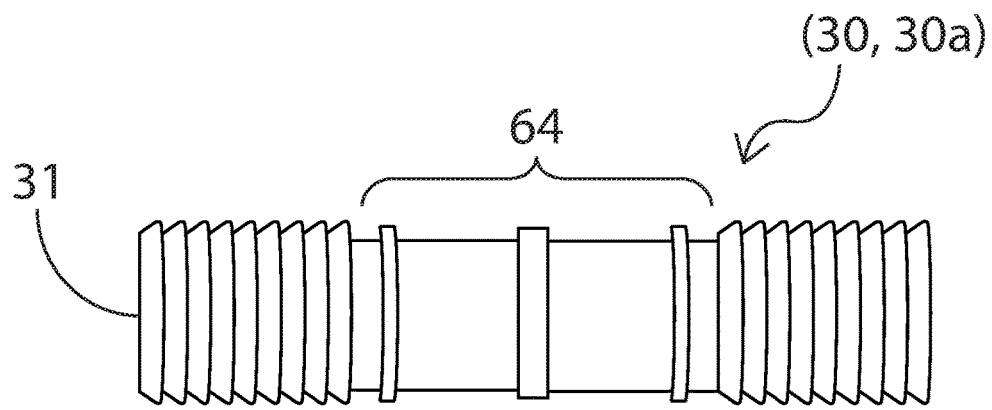
FIG. 10a is a side view showing an embodiment of the segmented tubular wall in FIGS. 1a, 2a, 3a and 4a with several contiguous segments replaced with a straight element.
Figure 10B:
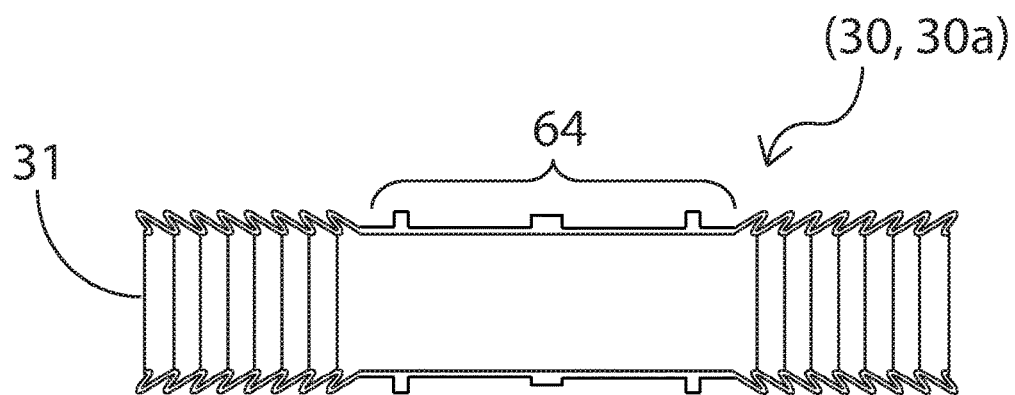
Figure 11A:
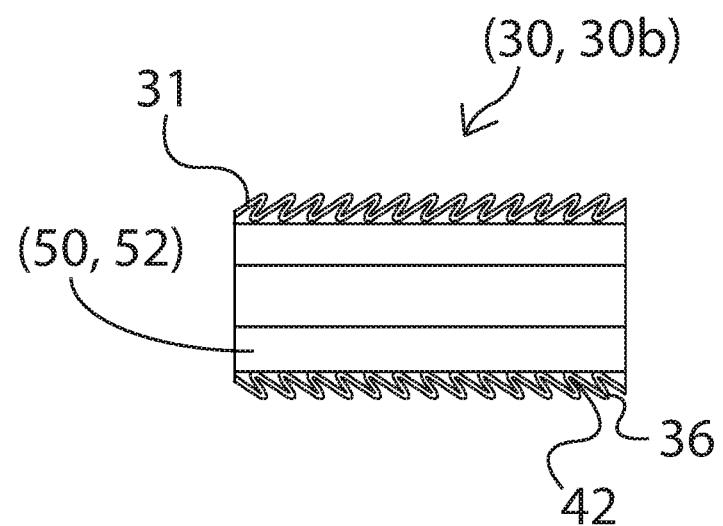
FIG. 11a is a side, sectional view of a section of hose of FIG. 2a in the contracted state showing both the segmented tubular wall and internal elastic tubular wall.
Figure 11B:
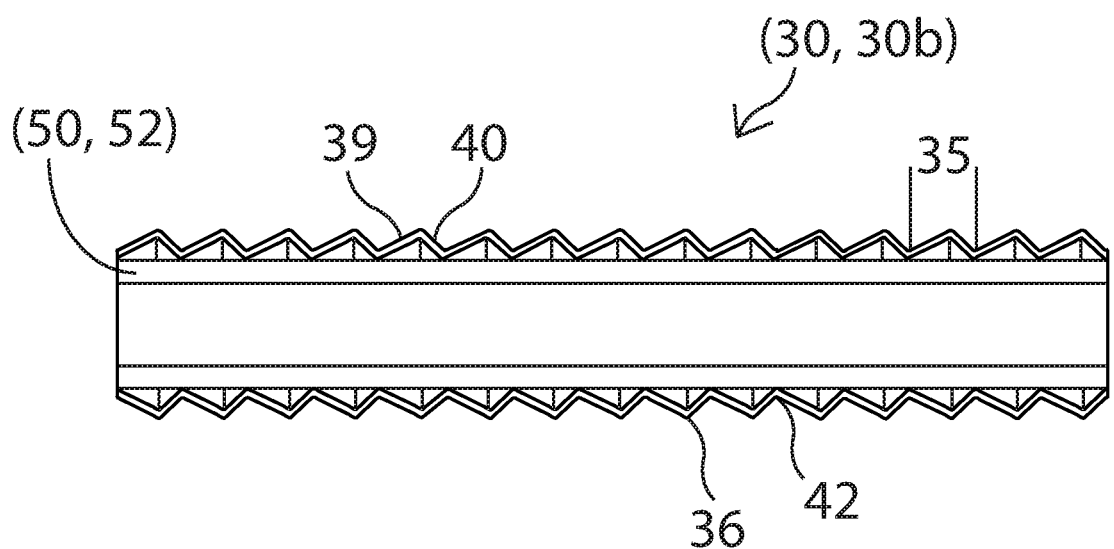
FIG. 11b is a side, sectional view of the section of hose of FIG. 11a in the expanded state.
Figure 15C:
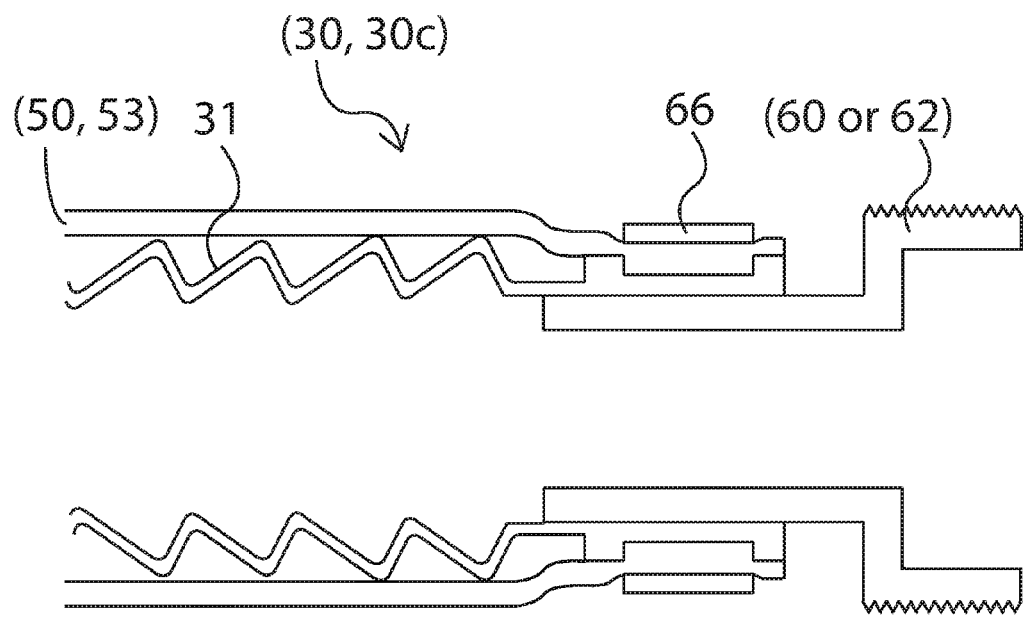
FIG. 15c is a side, sectional view of one embodiment of a coupler that may be added to the hose in FIGS. 3a and 3c.
Figure 15D:
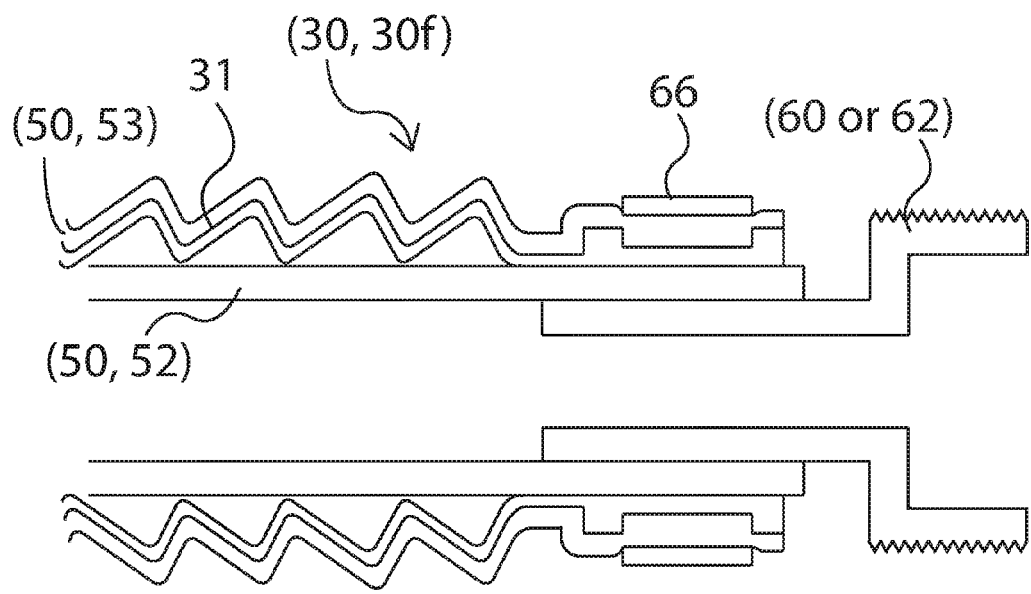
FIG. 15d is a side, sectional view of one embodiment of a coupler that may be added to the hose having both an internal and external bias.
Figure 15E:
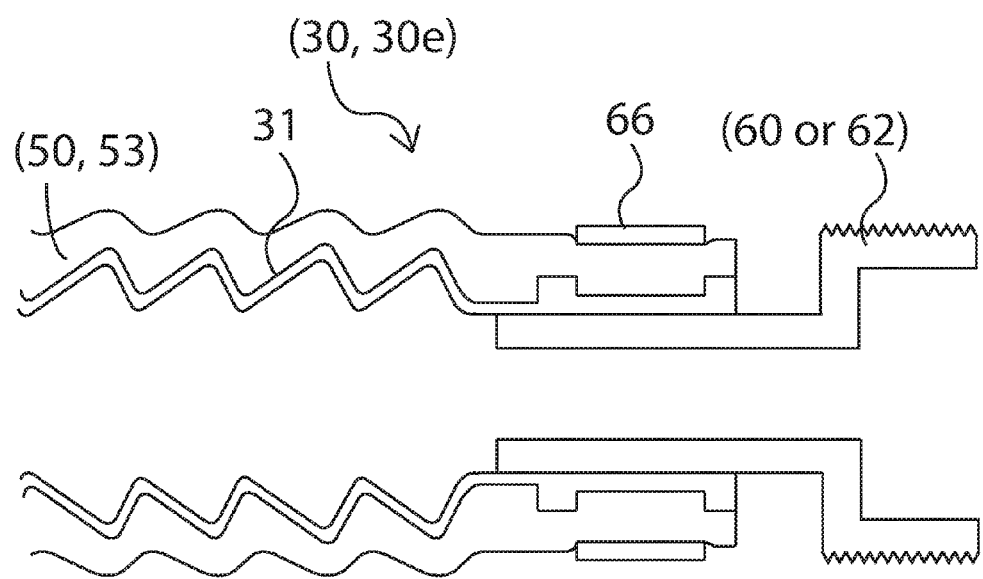
FIG. 15e is a side, sectional view of one embodiment of a coupler that may be added to the hose in FIGS. 4a and 4c.

In order to use hose 30 for different applications, the hose may include a first coupler 60 on first end 33 and a second coupler 62 on said second end 34. Hose 30 may include a wide variety of couplers and not those just shown in FIGS. 15a-15e. To aid in attaching couplers (60, 62) to hose 30, the hose may be produced with straight sections 64 as shown in FIGS. 10a and 10b where the straight sections are at specified lengths along the length of the fabricated hose. Straight sections 64 are then cut at the midpoint of the straight section. This produces a straight section 64 at both ends of hose 30 as shown in FIGS. 9a and 9b. FIGS. 15a-15e show five embodiments of how couplers (60, 62) may be integrated with hose 30. In FIG. 15a, straight section 64 of hose 30a is slipped over the coupler and secured with adhesive, thermal bonding or a compression fitting 66. In the embodiment of hose 30b where an internal elastic tube is used as the internal biasing element 52, elastic tube may be fitted over the coupler and straight section 64 of the hose fitted over the internal elastic tube, FIG. 15b. Again the straight section 64 and internal elastic tube may be secured to couplers (60, 62) with adhesive, thermal bonding, a compression fitting 66 or a barbed/ribbed fitting. In the embodiment of hose 30c where an external elastic tube is used as the external biasing element 53, the external elastic tube may be fitted over the coupler and straight section 64 of the hose, FIG. 15c. The straight section 64 and external elastic tube 53 may be secured to couplers (60, 62) with adhesive, thermal bonding, a compression fitting 66 or a barbed/ribbed fitting. In the embodiment of hose, 30e, where an external elastic layer is used as the external biasing element 53, the external elastic layer may be fitted over the coupler and straight section 64 of the hose, FIG. 15e. Again the straight section 64 and external elastic layer 53 may be secured to couplers (60, 62) with adhesive, thermal bonding, a compression fitting 66 or a barbed/ribbed fitting. FIG. 15d alternatively shows a hose structure 30f having both an internal bias element 52 and an external bias element 53 joined to a coupler (60, 62). For all hoses 30b-30f it is also possible to have each internal bias element 52 and external bias element 53 directly joined to segmented tubular wall 31 and the segmented tubular wall by itself joined to couplers (60, 62). Alternatively, each internal bias element 52, external bias element 53 and segmented tubular wall 31 may each be joined separately to couplers (60, 62).

Figure 16:
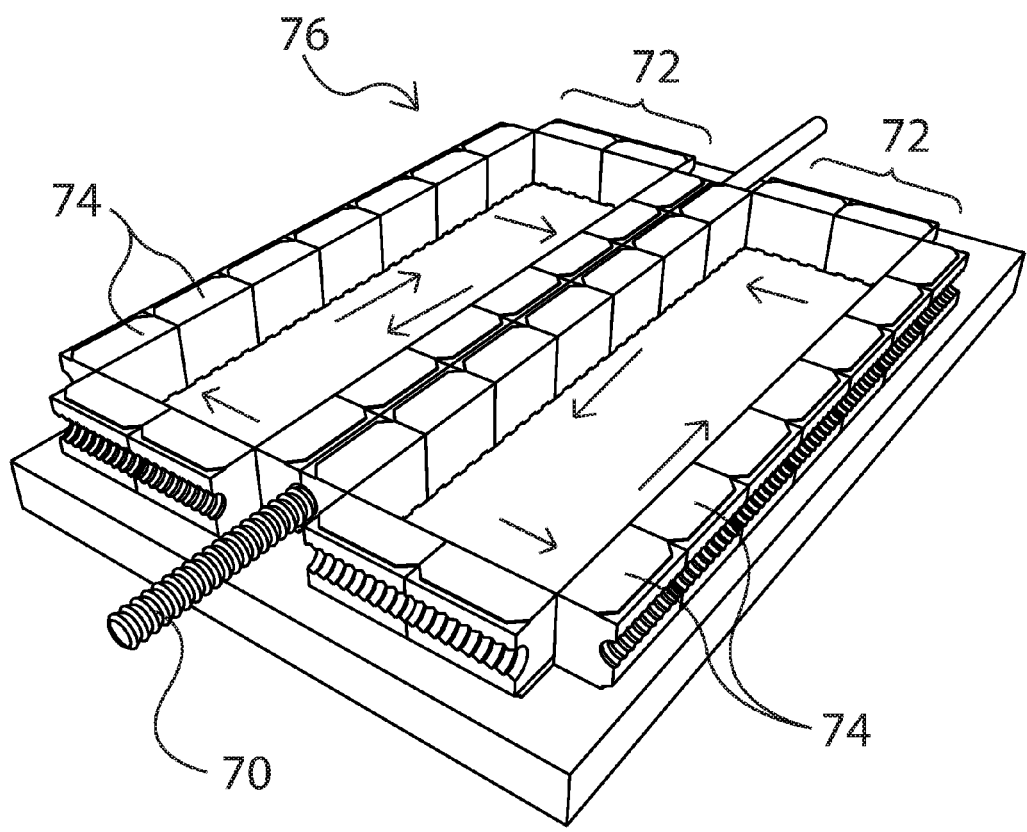
FIG. 16 is a perspective view illustrating one embodiment of tooling used to process a segmented tubular hose structure that is a precursor to the segmented tubular wall shown in FIGS. 1a-4d and 13a-13b.
Figure 17:
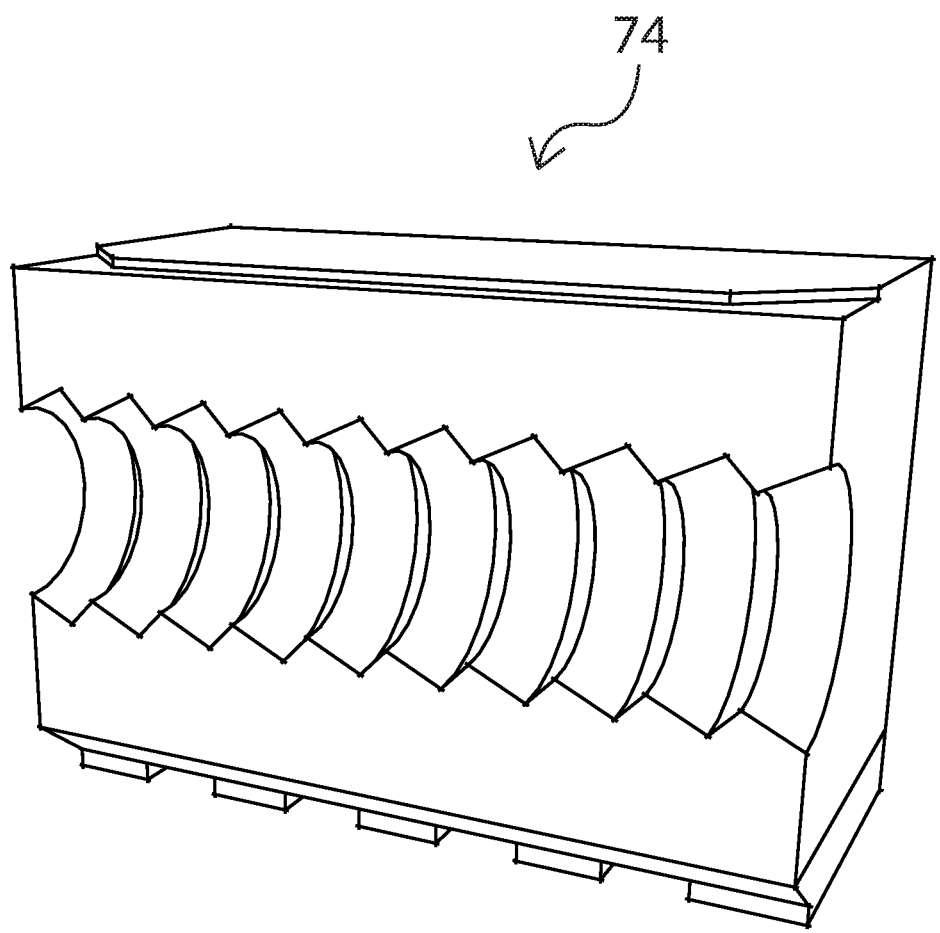
FIG. 17 is a perspective view of a mold block used in conjunction with the tooling illustrated in FIG. 16.
Figure 18A:
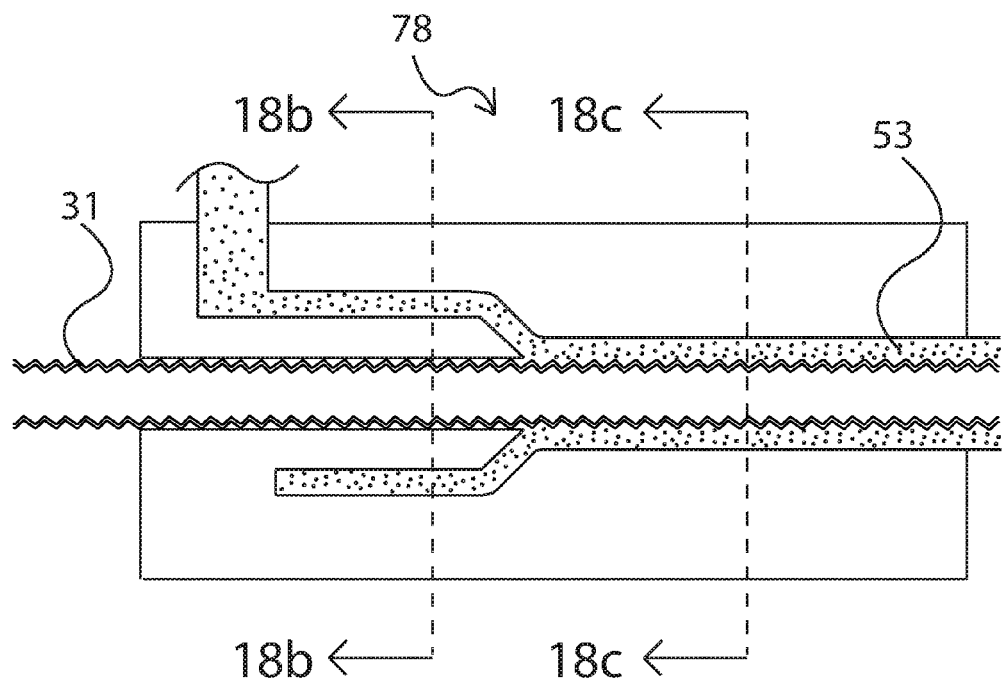
FIG. 18a is a sectional schematic diagram of a co-extrusion head that may be used to process the elastic tubular wall on the interior or exterior of segmented tubular wall of FIGS. 2a-4d.
Figures 18B, 18C:
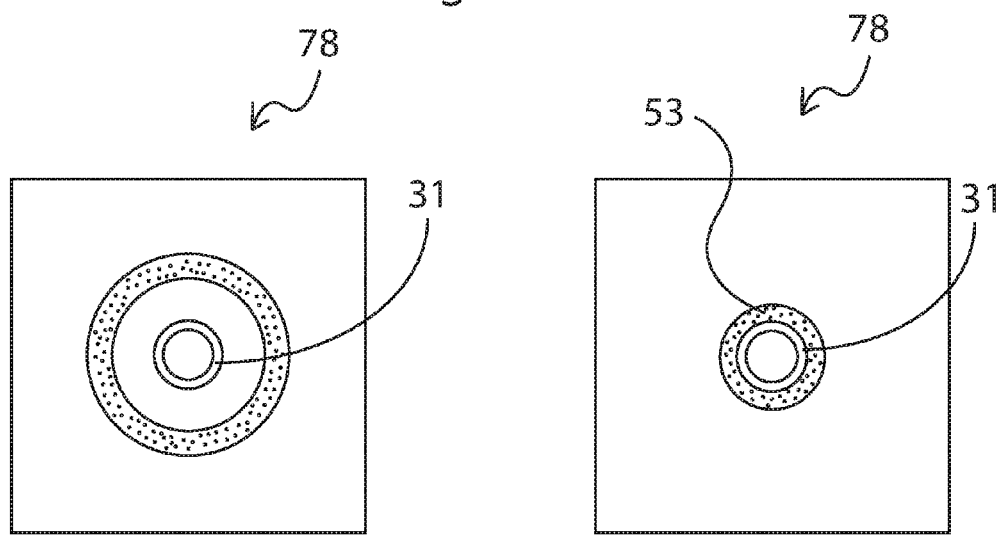
FIG. 18b is sectional view of the co-extrusion head of FIG. 18a along line 18b-18b.
FIG. 18c is a sectional view of the co-extrusion head of FIG. 18b along line 18c-18c.

Hose 20 may be fabricated using corrugated extrusion techniques as shown in FIG. 16. In this embodiment segmented tubular wall 31 (a.k.a. corrugated hose structure) is formed by having two tracks 72 holding mold blocks 74 (FIG. 17) rotate along the length of the extruder 76. Heated extrusion material is fed at the feed end and pressurized from within by air. The extrusion material is expanded and forced against the inner sides of mold blocks 74 forming a single layer against the inner sides. The material cools as it moves along the length of extruder 76 and exits having corrugated hose structure 70 having segmented tubular wall 31.

Figure 20A:
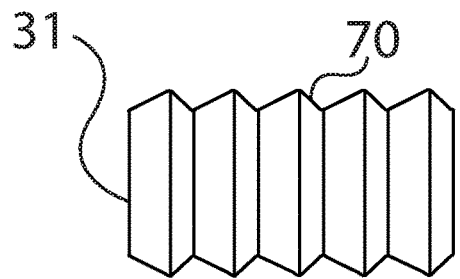
FIG. 20a is a side view showing a first step involved for adding an intrinsic bias during an embodiment of fabricating the segmented tubular wall in FIGS. 1a-4d and 13a-13b.
Figure 20B:
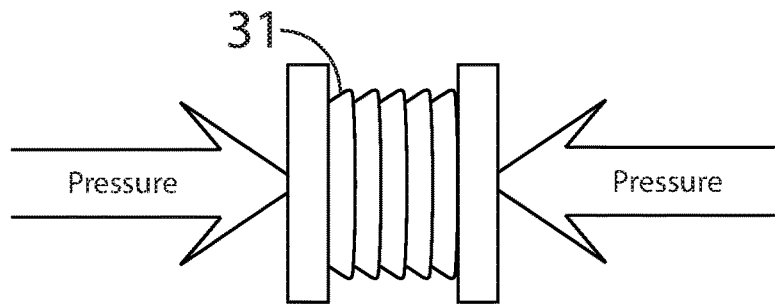
FIG. 20b is a side view showing a second step involved for adding an intrinsic bias during an embodiment of fabricating the segmented tubular wall in FIGS. 1a-4d and 13a-13b.
Figure 20C:
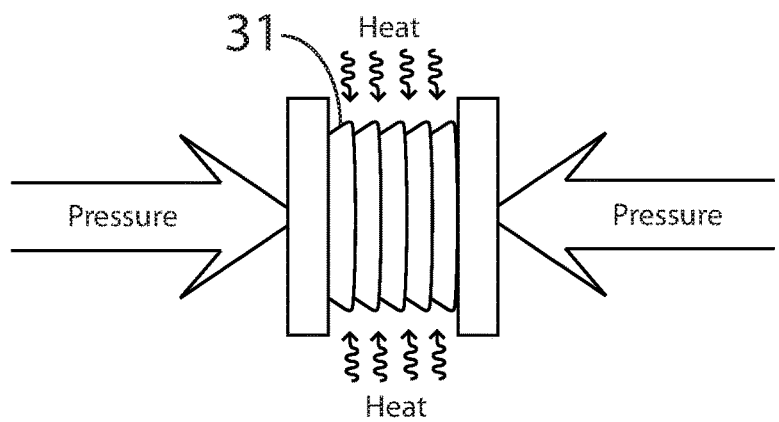
FIG. 20c is a side view showing a third step involved for adding an intrinsic bias during an embodiment of fabricating the segmented tubular wall in FIGS. 1a-4d and 13a-13b.
Figure 20D:
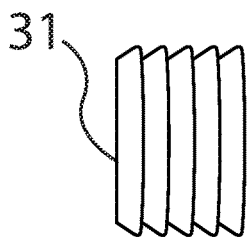
FIG. 20d is a side view showing a fourth step involved for adding an intrinsic bias during an embodiment of fabricating the segmented tubular wall in FIGS. 1a-4d and 13a-13b.

To produce a hose 30 with an intrinsic material memory force built into segmented tubular wall 31, additional processing is performed once the segmented tubular wall has been created. The as extruded segmented tubular wall 31, FIG. 20a, is first collapsed by applying pressure to the corrugated hose structure, FIG. 20b. The compressed structure in the contracted state is then annealed, under temperature and pressure, for the molecules to gain a memory position within the collapsed structure, FIG. 20c. Once cooled, the molecules making up segmented tubular wall 31 now remember their position so that after any extension, the hose will return to the collapsed state whenever any extension forces are removed, FIG. 20d. This process produces an intrinsic bias in segmented tubular wall 31. Segmented tubular wall 31 may be fabricated from a wide variety of raw corrugating materials (thermosets and thermoplastics, i.e. polymers) that have properties of being flexible or semi-rigid. Some of these materials are listed in FIG. 19a along with exemplary thermal processing needed to produce the material shape memory force with the shape memory polymer. Alternatively, shorter anneal times of only minutes may be achieved by dipping the heated materials into water or putting them through a high-speed cooler. Depending on the material, anneal temperatures may also be broader than those listed in FIG. 19a and in a range of 50° C. to 450° C.

In the embodiment where an internal bias element 52, such as an internal elastic tube is used to form hose 30b, segmented tubular wall 31 is cut to a selected length, then the elastic tube is threaded through the segmented tubular wall and couplers (60, 62) added to both ends.

In the embodiment where an external bias element 53 such as an external elastic tube or external elastic layer is used to form hose 30c, co-extrusion may be used. Co-extrusion uses a co-extruder 78 where the elastic bias is created in a separate step by fabricating an elastic tube or layer around segmented tubular wall 31. The compressed segmented tubular wall 31 is fed into the co-extruder head and the elastic material is extruded around the segmented tubular wall, FIGS. 18a-c. The elastic material may make a uniform layer around segmented tubular wall 31. The elastic layer becomes external bias element 53. The elastic layer may conform during expansion or create air gaps between the elastic layer and the segmented tubular wall 31. Elastic materials and processing temperatures are listed in FIG. 19b. In other embodiment, elastic layer may be created by a spray or dip process.

In general a double wall hose 30 with a segmented tubular wall 31 and either an internal biasing layer or and external biasing layer will be stronger and can withstand more pressure from within. External biasing layers can also smooth ridges in the segmented tubular wall and make the hose more abrasion resistant.

Figure 21:
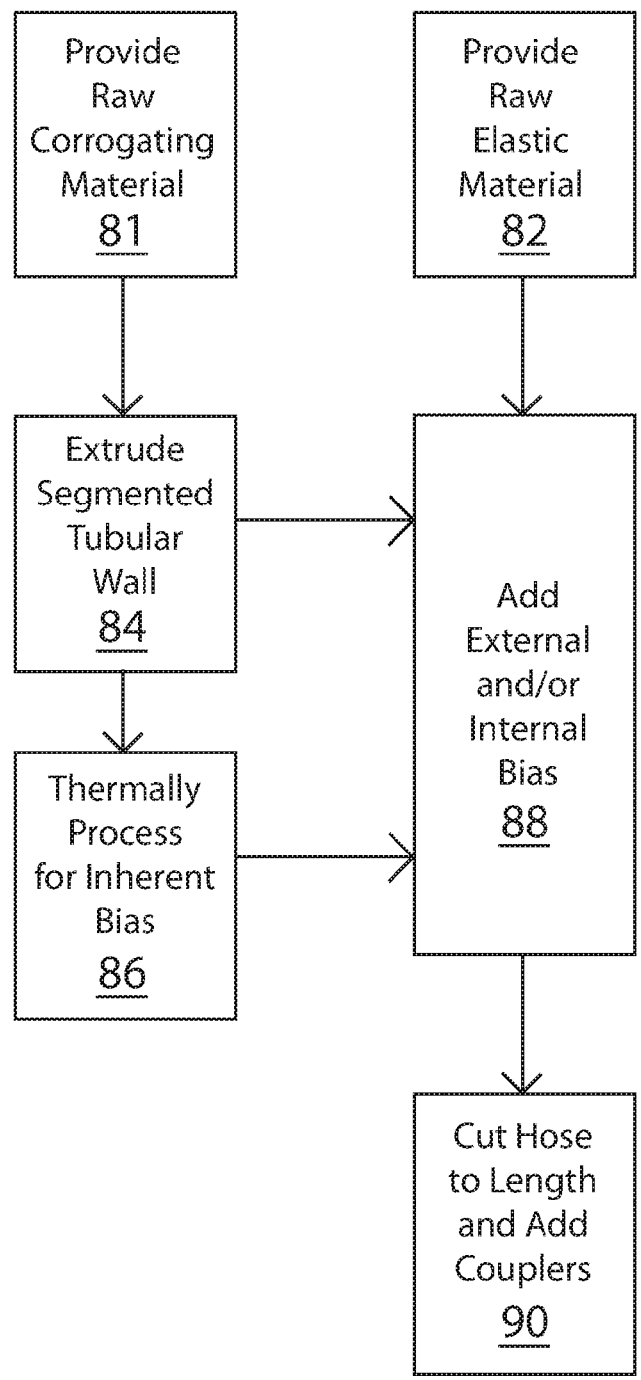
FIG. 21 is a process flow chart illustrating the general process flow for making the hose structures shown in FIGS. 1a-4d and 13a-13b.

FIG. 21 illustrates a general process flow for fabricating hoses 30a-30e. The process starts with providing raw corrugating materials 81 and raw elastic materials 82. The raw corrugating material 81 is then processed by extrusion 84 into segmented tubular wall 31. If an intrinsic bias is required, the segmented tubular wall is processed thermally 86 to induce an intrinsic bias. Internal bias element 52 and external bias element 53 are then added by internal and external bias introduction 88 as desired. The resulting structure is then processed by step 90 to form a hose 30 by cutting the structure to length and adding couplers (60,62).

Figure 22A:
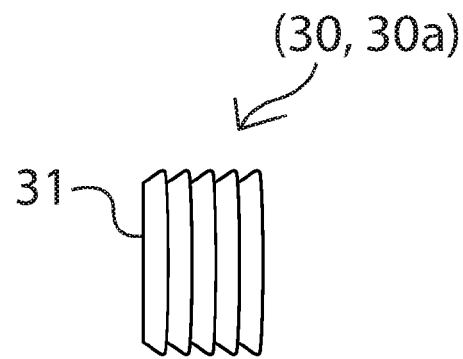
FIG. 22a is a side view illustrating the contracted state of the hose shown in FIGS. 1a-1d.
Figure 22B:
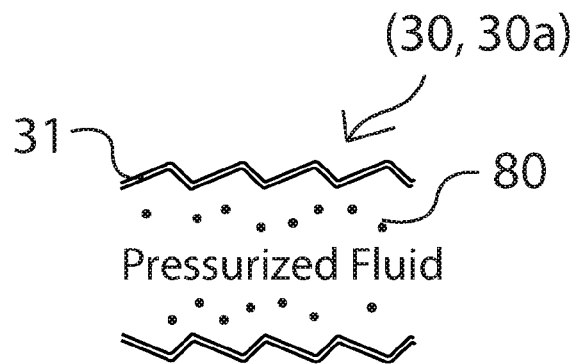
Figure 22C:
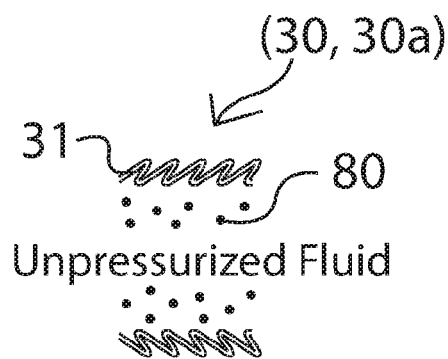

FIGS. 22a-22c illustrate how fluid pressure from within interior 32 of segmented tubular wall 31 of hose 30a actuates the expansion and contraction of the hose having a built-in bias (i.e., material memory force). With no fluid within hose 30a, the hose remains in a fully collapsed state, FIG. 22a. When a pressurized fluid 80 fills interior 32, contiguous segments 35 expand, FIG. 22b. Pressurized fluid 80 may be any fluid, examples being water or compressed air. When pressurized fluid 80 is turned off, some residual fluid remains within interior 32, but having no pressure to support the walls in an expanded state the memory forces collapse hose 30a, FIG. 22c.

Figure 23A:
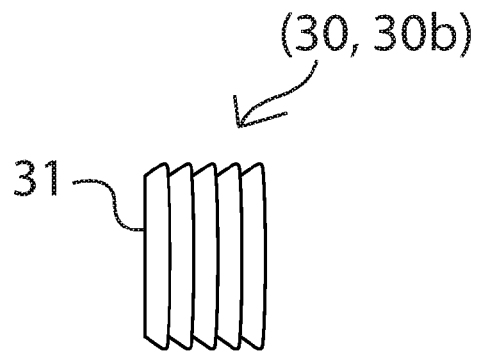
FIG. 23a is a side view illustrating the contracted state of the hose shown in FIGS. 2a-2d.
Figure 23B:
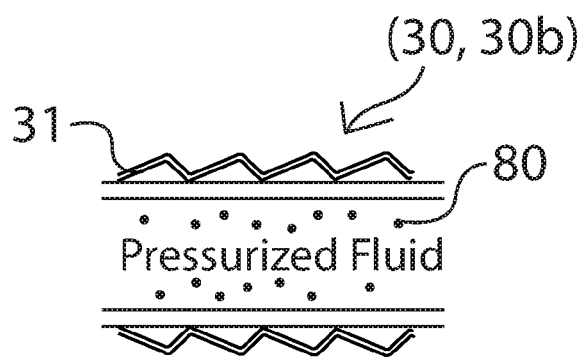
Figure 23C:
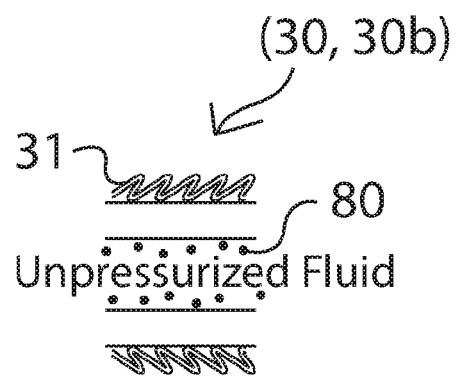

FIGS. 23a-23c illustrate how fluid pressure from within hose 30b influences the expansion and contraction of the hose having an internal bias element 52 as an elastic tube. With no fluid within hose 30b, the hose remains in a fully collapsed state, FIG. 23a. When a pressurized fluid 80 fills interior 82 of internal elastic tube, both internal elastic tube and contiguous segments 35 expand, FIG. 23b. Pressurized fluid 80 may be any fluid, examples being water or compressed air. When pressurized fluid 80 is turned off, some residual fluid remains within interior 32, but having no pressure to support the walls in an expanded state the bias forces collapse hose 30b, FIG. 23c.

Figure 24A:
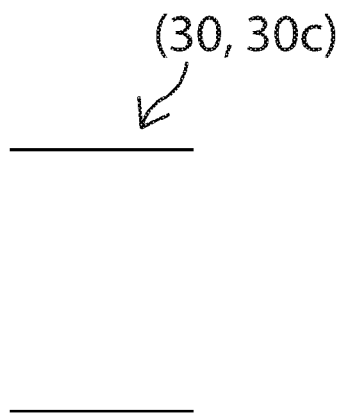
FIG. 24a is a side view illustrating the contracted state of the hose shown in FIGS. 3a-3d.
Figure 24B:
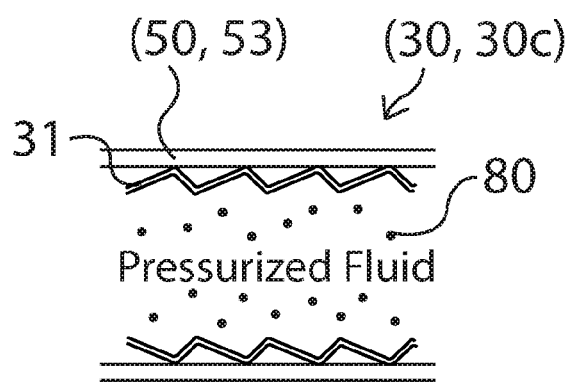
Figure 24C:
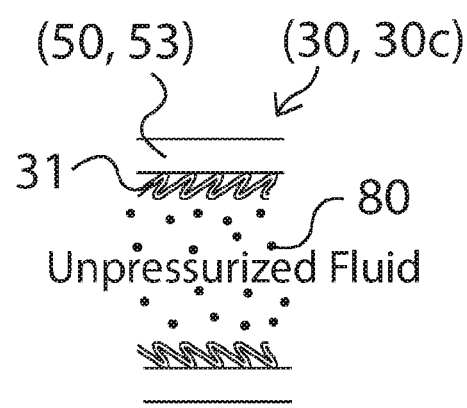
Figure 25A:
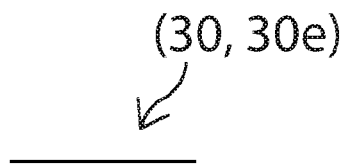
FIG. 25a is a side view illustrating the contracted state of the hose shown in FIGS. 4a-4d.
Figure 25B:
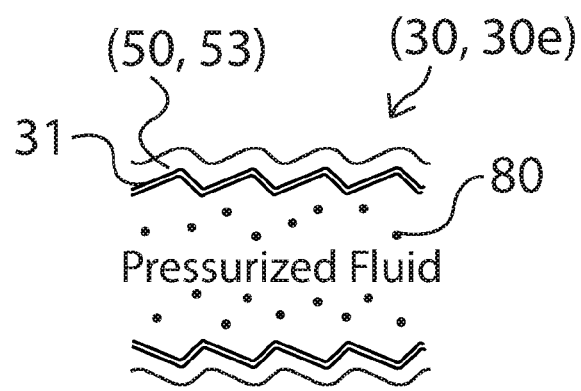
Figure 25C:
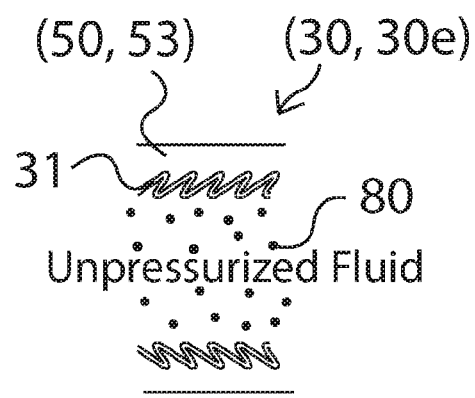

FIGS. 24a-24c illustrate how fluid pressure from within hose 30c influences the expansion and contraction of the hose having an external bias element 53 as an elastic sleeve. With no fluid within hose 30c, the hose remains in a fully collapsed state, FIG. 24a. When a pressurized fluid 80 fills interior 32, contiguous segments 35 and elastic sleeve expand, FIG. 24b. Pressurized fluid 80 may be any fluid, examples being water or compressed air. When pressurized fluid 80 is turned off, some residual fluid remains within interior 32, but having no pressure to support the walls in an expanded state the bias forces collapse hose 30c, FIG. 24c.

FIGS. 24a-24c illustrate how fluid pressure from within hose 30e influences the expansion and contraction of the hose having an external bias element 53 as a bonded elastic layer. With no fluid within hose 30e, the hose remains in a fully collapsed state, FIG. 25a. When a pressurized fluid 80 fills interior 32, contiguous segments 35 and bonded elastic layer expand, FIG. 25b. Pressurized fluid 80 may be any fluid, examples being water or compressed air. When pressurized fluid 80 is turned off, some residual fluid remains within interior 32, but having no pressure to support the walls in an expanded state the bias forces collapse hose 30e, FIG. 25c.

While several embodiments of the invention, together with modifications thereof, have been described in detail herein and illustrated in the accompanying drawings, it will be evident that various further modifications are possible without departing from the scope of the invention. The scope of the claims should not be limited by the preferred embodiments set forth in the examples, but should be given the broadest interpretation consistent with the description as a whole.

What is claimed is:

1. A hose, comprising:
   a segmented tubular wall circumscribing an interior, said segmented tubular wall having a first end, a second end and length; wherein said segmented tubular wall is formed of a shape memory material; wherein said segmented tubular wall is a plurality of contiguous segments; wherein each said contiguous segment is a pair of frustum of a right cone having a circumscribing apex lying within a transverse plane and defining an outer radius, a first wall segment angled from said apex towards said interior at a first angle from said transverse plane, and a second wall segment angled from said apex towards said interior at a second angle from said transverse plane; wherein said first and second wall segments of adjacent contiguous segments terminate in a circumscribing trough defining an inner radius; wherein said segmented tubular wall has a material memory force actuated by pressure from within said interior; and wherein said first and second wall segments extend from the same side of said transverse plane in a contracted state and extend from opposites sides of said transverse plane in an expanded state.

2. A hose as recited in claim 1, wherein said transverse plane is perpendicular to said length.

3. A hose as recited in claim 1, further comprising a bias to keep said first wall segment and said second wall segment on the same side of said transverse plane in a contracted state.

4. A hose as recited in claim 3, wherein said bias is an external biasing element.

5. A hose as recited in claim 4, wherein said external biasing element is an external elastic layer.

6. A hose as recited in claim 5, wherein said external elastic layer is a porous layer.

7. A hose as recited in claim 5, wherein said external elastic layer is an elastic sleeve that freely moves independently of said segmented tubular wall.

8. A hose as recited in claim 5, wherein said external elastic layer is bonded at the apex of each contiguous segment with air gaps between said elastic layer and said segmented tubular wall at said troughs.

9. A hose as recited in claim 5, wherein said external elastic layer is an elastic coating bonded everywhere to said segmented tubular wall.

10. A hose as recited in claim 3, wherein said bias is an internal biasing element contained within said interior.

11. A hose as recited in claim 10, wherein said internal biasing element is an internal elastic tube having an internal elastic wall.

12. A hose as recited in claim 1, further comprising a first coupler on said first end.

13. A hose as recited in claim 1, further comprising a second coupler on said second end.

14. A hose as recited in claim 1, whereby when in the expanded state said second angle is less than said first angle.

15. A hose as recited in claim 1, whereby when in the contracted state said second angle is less than said first angle.

16. A hose as recited in claim 1, whereby when said length increases, said length increases in discrete increments as each contiguous segment expands independently of other contiguous segments.

17. A hose as recited in claim 1, whereby when said length increases, said length increases continuously as all contiguous segments expand equally.

18. A hose as recited in claim 1, whereby the application of pressure from within said interior causes said second angle to transition from one side to the other side of said transverse plane.

19. A hose as recited in claim 1, wherein said tubular wall has an elongation ratio of the length in the expanded state to the length in the contracted state that is greater than 2 to 1.

20. A hose, comprising:
A segmented tubular wall circumscribing an interior, said segmented tubular wall having a first end, a second end and length; said segmented tubular wall is formed of a single layer of shape memory material; said segmented tubular wall having a plurality of contiguous segments that each expand along said length of said segmented tubular wall with the application of pressure from within said interior; each said contiguous segment being a pair of frustum of a right cone; an intrinsic shape memory force bias to hold said continuous segments in a collapsed state when no pressure is applied from within said interior; wherein each contiguous segment has a circumscribing apex that defines an outer radius; wherein each contiguous segment has a first wall segment angled from said apex towards said interior, a second wall segment angled from said apex towards said interior, and an expansion angle there between; and wherein said expansion angle is zero in the collapsed state and said expansion angle is greater than 30-degrees in an expanded state.

21. A hose as recited in claim 20, whereby when pressure is removed from within said interior said length collapses.

22. A hose as recited in claim 20, further comprising an external elastic layer.

23. A hose as recited in claim 1, wherein said shape memory is a single layer of shape memory material.

24. A hose as recited in claim 1, wherein said shape memory material is a shape memory polymer.

25. A hose as recited in claim 1, wherein said shape memory force is generated by thermal annealing of said segmented tubular wall in a contracted state.

26. A hose as recited in claim 20, wherein said shape memory material is a shape memory polymer.

27. A hose, comprising:
A segmented tubular wall circumscribing an interior, said segmented tubular wall having a first end, a second end and length; said segmented tubular wall is formed of a single layer of shape memory material; said segmented tubular wall having a plurality of contiguous segments that each expand along said length of said segmented tubular wall with the application of pressure from within said interior; each said contiguous segment being a pair of frustum of a right cone; an intrinsic shape memory force bias to hold said continuous segments in a collapsed state when no pressure is applied from within said interior; and an internal elastic tube having an internal elastic wall.

28. A hose, comprising:
A segmented tubular wall circumscribing an interior, said segmented tubular wall having a first end, a second end and length; said segmented tubular wall is formed of a single layer of shape memory material; said segmented tubular wall having a plurality of contiguous segments that each expand along said length of said segmented tubular wall with the application of pressure from within said interior; each said contiguous segment being a pair of frustum of a right cone; an intrinsic shape memory force bias to hold said continuous segments in a collapsed state when no pressure is applied from within said interior; and wherein said shape memory force is generated by thermal annealing of said segmented tubular wall in a contracted state.

* * * * *